(12) United States Patent
Tai et al.

(10) Patent No.: US 7,255,904 B2
(45) Date of Patent: Aug. 14, 2007

(54) POLYVINYL ALCOHOL RESIN COMPOSITION AND MULTILAYER PACKAGES

(75) Inventors: Shinji Tai, Kurashiki (JP); Hiroyuki Shimo, Kurashiki (JP); Masakazu Nakaya, Kurashiki (JP); Mizuho Maeda, Kashima-gun (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 110 days.

(21) Appl. No.: 10/111,911

(22) PCT Filed: Aug. 31, 2001

(86) PCT No.: PCT/JP01/07579

§ 371 (c)(1),
(2), (4) Date: May 1, 2002

(87) PCT Pub. No.: WO02/18489

PCT Pub. Date: Mar. 7, 2002

(65) Prior Publication Data

US 2003/0022974 A1    Jan. 30, 2003

(30) Foreign Application Priority Data

Sep. 1, 2000  (JP) .............................. 2000-266181

(51) Int. Cl.
*B29D 22/00* (2006.01)
*B29D 23/00* (2006.01)
*B32B 1/08* (2006.01)

(52) U.S. Cl. ..................... 428/36.6; 428/36.7; 428/220; 428/482; 525/57; 525/61; 525/360; 525/370

(58) Field of Classification Search ............... 428/36.6, 428/36.7, 220, 482; 525/57, 61, 360, 370
See application file for complete search history.

(56) References Cited

U.S. PATENT DOCUMENTS

| 4,429,076 A |   | 1/1984 | Saito et al. |
| 5,084,352 A | * | 1/1992 | Percec et al. ............... 428/412 |
| 5,346,644 A |   | 9/1994 | Speer et al. |
| 5,466,748 A |   | 11/1995 | Ikeda et al. |

FOREIGN PATENT DOCUMENTS

| EP | 0 546 546  | 6/1993  |
| JP | 50-023443  | 3/1975  |
| JP | 56-115344  | 9/1981  |
| JP | 63-304043  | 12/1988 |
| JP | 4-211444   | 8/1992  |
| JP | 5-295171   | 11/1993 |
| JP | 7-207097   | 8/1995  |
| JP | 7-331020   | 12/1995 |
| JP | 10-259301  | 9/1998  |

\* cited by examiner

*Primary Examiner*—Michael C. Miggins
(74) *Attorney, Agent, or Firm*—Oblon, Spivak, McClelland, Maier & Neustadt, P.C.

(57) ABSTRACT

The present invention provides a resin composition having an oxygen scavenging function. The resin composition comprises 70 to 99.9 wt % of a polyvinyl alcohol resin (A) and 0.1 to 30 wt % of a thermoplastic resin (B) other than the polyvinyl alcohol resin (A), wherein the thermoplastic resin (B) has a carbon-carbon double bond and a functional group including a hetero atom, and an oxygen absorption rate of the resin composition is 0.001 ml/m²·day or more.

13 Claims, 3 Drawing Sheets

POLYVINYL ALCOHOL RESIN COMPOSITION AND MULTILAYER PACKAGES

TECHNICAL FIELD

The present invention relates to a resin composition having an oxygen scavenging function. The present invention also relates to a resin composition having good gas barrier properties, moisture-resistance, aroma retentivity, and flavor barrier properties, in addition to the oxygen scavenging function, and a multilayered container made of such a resin composition.

BACKGROUND ART

Ethylene-vinyl alcohol copolymer (hereinafter also abbreviated as EVOH) can be melt-molded, and has excellent gas barrier properties against oxygen or carbon dioxide gas. For this reason, a multilayered structure including a layer made of EVOH and a layer made of a thermoplastic resin having excellent moisture-resistance, mechanical properties or the like (e.g., thermoplastic polyester; hereinafter thermoplastic polyester may be abbreviated as PES) is utilized for various molded products (e.g., films, sheets, bottles, containers, etc.) that require gas barrier properties. For example, such multilayered structures are used in various fields as a multilayered container, in particular, in the form of bags, bottles, cups, pouches, etc. For example, they are widely used in such fields as foods, cosmetics, medicines, toiletries and the like.

Such a multilayered container has good barrier properties against oxygen, carbon dioxide gas, and the like. However, its permeability of gases such as oxygen is not exactly zero, unlike metals used for cans, etc. and glass used for bottles, etc. but still permits transmission of gas in an amount that cannot be neglected. In particular, for containers of foods, the degradation of food contents due to oxidation when the food is preserved for a long time is of great concern. Therefore, improvement of the oxygen barrier properties is strongly desired.

Furthermore, when filling the contents into a container, oxygen may be mixed in the container together with the contents. When the contents are susceptible to oxidization, even a trace amount of oxygen may degrade the quality of the contents. In order to prevent this, providing a material of the container with an oxygen scavenging function has been proposed. In this case, oxygen that might enter the container from the outside can be scavenged, so that the gas barrier properties of a packaging material also can be improved.

For example, as the method of providing the oxygen scavenging function to the EVOH that constitutes a packaging material, the following methods are known: (1) An oxidation catalyst such as a transition metal is added to the EVOH to make the EVOH susceptible to oxidation, thereby providing the EVOH with the oxygen scavenging function (Japanese Laid-Open Patent Publication (Tokkai) No.4-211444); (2) A resin composition mainly comprising polyolefin and an oxidation catalyst, that is, polyolefin in a state susceptible to oxidation, is dispersed in the EVOH, thereby providing the EVOH with the oxygen scavenging function (Japanese Laid-Open Patent Publication (Tokkai) No.5-156095); and (3) EVOH, polyolefin, and an oxidation catalyst are blended to make the EVOH and polyolefin susceptible to oxidation, thereby providing the oxygen scavenging function (Japanese Laid-Open Patent Publication (Tokkai) No.5-170980). However, method (1) fails to provide sufficiently improved oxygen barrier properties. Methods (2) and (3) have the disadvantage that the transparency is impaired significantly.

Furthermore, in multilayered containers, especially when no adhesive resin layer is provided between the layers and the container filled with a drink or food is subjected to an impact caused by, for example, being dropped, delamination between the thermoplastic resin layer (e.g., PES layer) and the EVOH layer is likely to occur, which causes a large problem in the appearance.

DISCLOSURE OF INVENTION

It is an object of the present invention to provide a composition having an oxygen scavenging function. It is another object of the present invention to provide a resin composition having good gas barrier properties, transparency, moisture-resistance, aroma retentivity, and flavor barrier properties, in addition to the oxygen scavenging function. It is still another object of the present invention to provide a multilayered container including a layer made of the resin composition having a good impact delamination resistance and good appearance, in particular, satisfactory transparency.

A first resin composition of the present invention comprises 70 to 99.9 wt % of a polyvinyl alcohol resin (A) and 0.1 to 30 wt % of a thermoplastic resin (B) other than the polyvinyl alcohol resin (A), wherein the thermoplastic resin (B) has a carbon-carbon double bond and a functional group including a hetero atom, and an oxygen absorption rate of the resin composition is 0.001 ml/m²·day or more.

In a preferred embodiment, the first resin composition further comprises a transition metal salt (C).

A second resin composition of the present invention comprises 70 to 99.9 wt % of a polyvinyl alcohol resin (A), 0.1 to 30 wt % of a thermoplastic resin (B) other than the polyvinyl alcohol resin (A), and a transition metal salt (C), wherein the thermoplastic resin (B) has a carbon-carbon double bond and a functional group including a hetero atom.

In a preferred embodiment, the amount of the transition metal salt (C) contained in the first or second resin composition (when the first resin composition comprises the transition metal salt (C)) is 1 to 5000 ppm in terms of a metal element, based on a total weight of the polyvinyl alcohol resin (A) and the thermoplastic resin (B).

In a preferred embodiment, the transition metal salt (C) comprises at least one transition metal selected from the group consisting of iron, nickel, copper, manganese, and cobalt.

In a preferred embodiment, the thermoplastic resin (B) comprises a carbon-carbon double bond in a ratio of 0.0001 eq/g or more.

In a preferred embodiment, the thermoplastic resin (B) comprises a unit represented by formula (I)

wherein R₁ is a hydrogen atom or an alkyl group having 1 to 5 carbon atoms, R₂ is a hydrogen atom, an alkyl group having 1 to 10 carbon atoms, an aryl group, an alkylaryl group, an arylalkyl group or an alkoxy group, $R_3$ and $R_4$ are each independently a hydrogen atom, an alkyl group having 1 to 10 carbon atoms, an aryl group that can be substituted, —COOR$_5$, —OCOR$_6$, a cyano group or a halogen atom, and $R_5$ and $R_6$ are each independently an alkyl group having 1 to 10 carbon atoms, an aryl group, an alkylaryl group, an arylalkyl group or an alkoxy group.

In a preferred embodiment, a number average molecular weight of the thermoplastic resin (B) is 1000 to 500000.

In a preferred embodiment, the polyvinyl alcohol resin (A) is an ethylene-vinyl alcohol copolymer having an ethylene content of 5 to 60 mol % and a degree of saponification of 90% or more.

In a preferred embodiment, a difference in refractive index between the polyvinyl alcohol resin (A) and the thermoplastic resin (B) is 0.01 or less.

In a preferred embodiment, in the above-mentioned resin compositions, particles of the thermoplastic resin (B) are dispersed in a matrix of the polyvinyl alcohol resin (A).

A third resin composition of the present invention comprises a thermoplastic resin (B), wherein the thermoplastic resin (B) comprises a unit represented by formula (I)

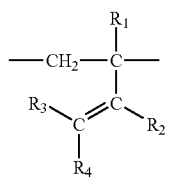

(I)

(wherein $R_1$ is a hydrogen atom or an alkyl group having 1 to 5 carbon atoms, $R_2$ is a hydrogen atom, an alkyl group having 1 to 10 carbon atoms, an aryl group, an alkylaryl group, an arylalkyl group or an alkoxy group, $R_3$ and $R_4$ are each independently a hydrogen atom, an alkyl group having 1 to 10 carbon atoms, an aryl group that can be substituted, —COOR$_5$, —OCOR$_6$, a cyano group or a halogen atom, and $R_5$ and $R_6$ are each independently an alkyl group having 1 to 10 carbon atoms, an aryl group, an alkylaryl group, an arylalkyl group or an alkoxy group); the thermoplastic resin (B) has a carbon-carbon double bond in a ratio of 0.0001 eq/g or more, and further has a functional group including a hetero atom; a number average molecular weight of the thermoplastic resin (B) is 1000 to 500000; and an oxygen absorption rate of the resin composition is 0.1 ml/m$^2$·day or more.

In a preferred embodiment, the third resin composition further comprises a transition metal salt (C) in a ratio of 1 to 50000 ppm in terms of a metal element, based on a weight of the thermoplastic resin (B).

A fourth resin composition of the present invention comprises a thermoplastic resin (B) and a transition metal salt (C); wherein the thermoplastic resin (B) comprises a unit represented by formula (I)

(wherein $R_1$ is a hydrogen atom or an alkyl group having 1 to 5 carbon atoms, $R_2$ is a hydrogen atom, an alkyl group having 1 to 10 carbon atoms, an aryl group, an alkylaryl group, an arylalkyl group or an alkoxy group, $R_3$ and $R_4$ are each independently a hydrogen atom, an alkyl group having 1 to 10 carbon atoms, an aryl group that can be substituted, —COOR$_5$, —OCOR$_6$, a cyano group or a halogen atom, and $R_5$ and $R_6$ are each independently an alkyl group having 1 to 10 carbon atoms, an aryl group, an alkylaryl group, an arylalkyl group or an alkoxy group); the thermoplastic resin (B) has a carbon-carbon double bond in a ratio of 0.0001 eq/g or more, and further has a functional group including a hetero atom; a number average molecular weight of the thermoplastic resin (B) is 1000 to 500000; and the transition metal salt (C) is contained in a ratio of 1 to 50000 ppm in terms of a metal element, based on a weight of the thermoplastic resin (B).

In a preferred embodiment, the transition metal salt (C) contained in the third or fourth resin composition (when the third resin composition comprises the transition metal salt (C)) comprises at least one transition metal selected from the group consisting of iron, nickel, copper, manganese, and cobalt.

In a preferred embodiment, the functional group including a hetero atom contained in the thermoplastic resin (B) is at least one functional group selected from the group consisting of a hydroxyl group, a carbonyl group, a trialkoxysilyl group and a boron-containing polar group.

In a preferred embodiment, the thermoplastic resin (B) comprises an aromatic vinyl compound unit and a diene compound unit.

In a preferred embodiment, the diene compound unit is at least one of an isoprene unit and a butadiene unit.

In a preferred embodiment, the aromatic vinyl compound unit is a styrene unit.

In a preferred embodiment, the thermoplastic resin (B) is a block copolymer.

A multilayered structure of the present invention comprises at least one layer made of any one of the first to fourth resin compositions.

A multilayered container of the present invention comprises at least one layer made of any one of the first to fourth resin compositions and at least one thermoplastic polyester layer.

In a preferred embodiment, in the above-mentioned multilayered container of the present invention, two thermoplastic polyester layers are arranged so as to be in direct contact with both surfaces of the layer made of the resin composition.

In a preferred embodiment, the multilayered container is obtained by coinjection blow molding.

BEST MODE FOR CARRYING OUT THE INVENTION

Figure 1:
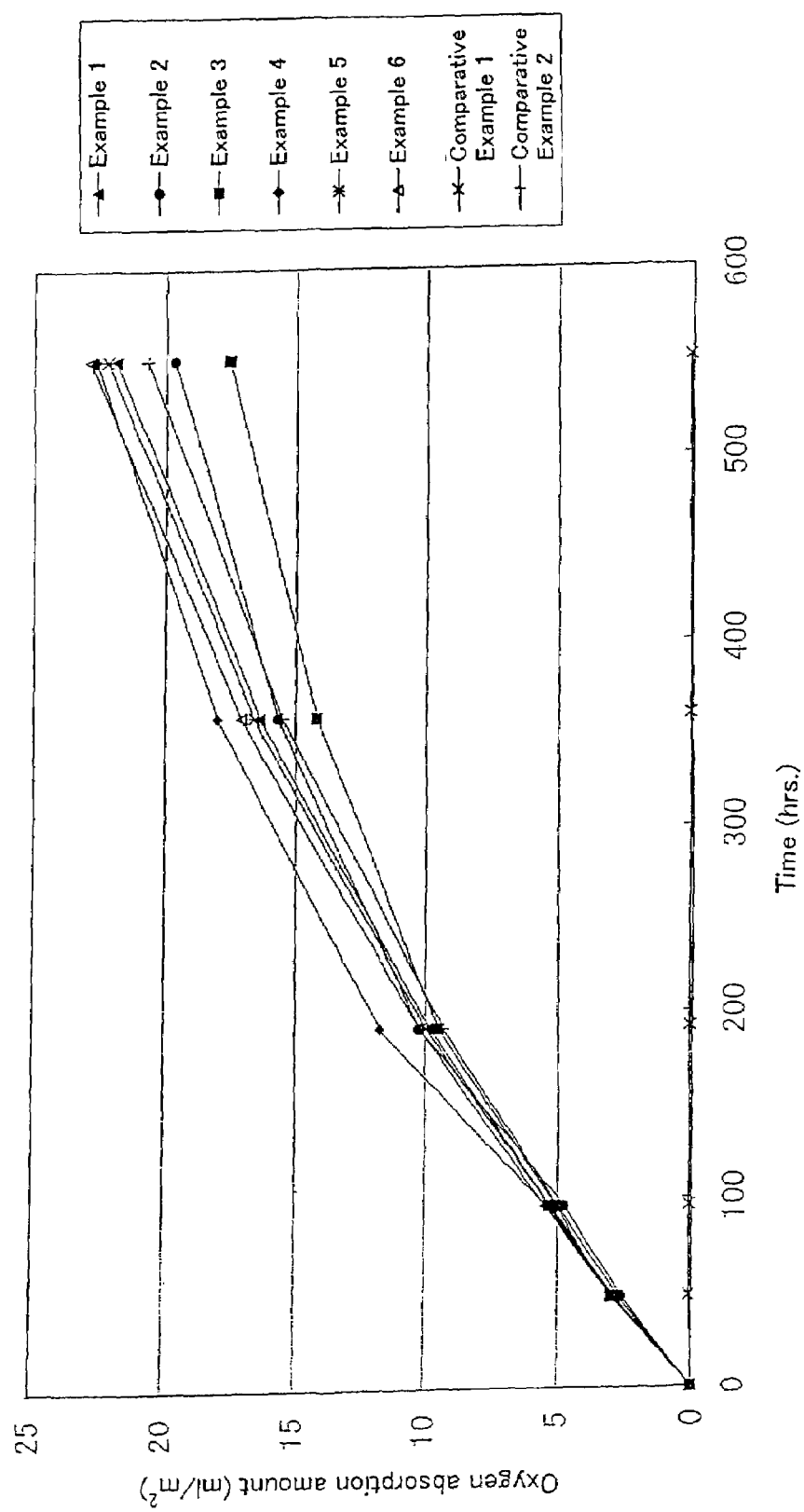
FIG. 1 is a graph in which the oxygen absorption amount of each of the single layer films obtained in Examples 1 to 6 and Comparative Examples 1 and 2 is plotted with respect to time. For Example 2, the graph shows the results of the second single layer film.

Hereinafter, the present invention will be described in detail.

In this specification, "scavenging oxygen" means absorbing and consuming oxygen or reducing the amount of oxygen from a given environment.

(Polyvinyl Alcohol Resin (A))

The polyvinyl alcohol resin (A) contained in the first resin composition and the second resin composition of the present invention can be obtained by saponifying a homopolymer of a vinylester or a copolymer of a vinylester and other monomers (especially a copolymer of a vinylester and ethylene) with an alkali catalyst or the like. A typical compound as the vinylester can be vinyl acetate, but other fatty acid vinylesters (e.g., vinyl propionate, vinyl pivalate, etc.) also can be used.

The degree of saponification of the vinyl ester component of the polyvinyl alcohol resin (A) is preferably 90% or more, more preferably 95% or more, and even more preferably 96% or more. When the degree of saponification is less than 90%, the gas barrier properties are degraded under high humidity, and if the polyvinyl alcohol resin (A) is EVOH, the thermal stability is insufficient and gel or aggregates can easily be generated in a molded article.

When the polyvinyl alcohol resin (A) is a blend of at least two kinds of polyvinyl alcohol resins (A) having different degrees of saponification, the average calculated based on the blend weight ratio is determined as the degree of saponification of the blend.

Among the polyvinyl alcohol resins (A) as described above, EVOH is preferable because melt-molding is possible and its gas barrier properties under high humidity are good.

The ethylene content of EVOH is preferably 5 to 60 mol %. If the ethylene content is less than 5 mol %, the gas barrier properties under high humidity may be degraded and the melt moldability may deteriorate. The ethylene content of EVOH is preferably 10 mol % or more, more preferably 15 mol % or more, most preferably 20 mol % or more. If the ethylene content exceeds 60 mol %, sufficiently good gas barrier properties may not be obtained. The ethylene content is preferably 55 mol % or less, more preferably 50 mol % or less.

When the EVOH is a blend of at least two kinds of EVOH having different ethylene contents, the average calculated based on the blend weight ratio is determined as the ethylene content of the blend. In this case, it is preferable that the difference in the ethylene contents between the two kinds of EVOH having the largest difference from each other is 30 mol % or less and that the difference in the degree of saponification is 10% or less. If these conditions are not satisfied, the transparency of the resultant resin composition layer may be inadequate. The difference in the ethylene content is preferably 20 mol % or less, more preferably 15 mol % or less. The difference in the degree of saponification is preferably 7% or less, more preferably 5% or less.

The ethylene content and the degree of saponification of EVOH can be measured by nuclear magnetic resonance (NMR).

The EVOH can contain a small amount of a monomer other than ethylene and vinyl alcohol as a copolymer component (the monomer is contained in EVOH as a copolymer unit) within a range not interfering with the objects of the present invention. Examples of such a monomer include: α-olefins such as propylene, 1-butene, isobutene, 4-methyl-1-pentene, 1-hexene, and 1-octene; unsaturated carboxylic acids such as itaconic acid, methacrylic acid, acrylic acid, and maleic anhydride, and their salts, their partial or complete esters, their nitriles, their amides, and their anhydrides; vinylsilane compounds such as vinyltrimethoxysilane, vinyltriethoxysilane, vinyltri(β-methoxy-ethoxy)silane, γ-methacryloxypropyltrimethoxysilane; unsaturated sulfonic acids and their salts; alkylthiols; and vinylpyrrolidones.

Among the above, if a vinylsilane compound is contained in EVOH as a copolymer component in an amount of 0.0002 to 0.2 mol % and the composition of the present invention containing the EVOH is formed into a multilayered structure together with a resin (e.g., PES) as a base resin by coextrusion molding or coinjection molding, the consistency in the melt viscosity of the EVOH with the base resin is improved, so that a uniformly molded article can be produced. As the vinylsilane compound, vinyltrimethoxysilane and vinyltriethoxysilane can be used preferably.

Furthermore, EVOH containing a boron compound is also effective in improving the melt viscosity of the EVOH, so that articles uniformly molded by coextrusion or coinjection molding can be obtained. Examples of the boron compound include boric acids, boric acid esters, borates, and boron hydrides. Specifically, examples of the boric acids include orthoboric acid (hereinafter may be referred to as "boric acid"), metaboric acid, and tetraboric acid. Examples of the boric acid esters include triethyl borate and trimethyl borate. Examples of the borates include alkali metal salts, alkaline-earth metal salts of the boric acids, borax, and the like. Among these compounds, orthoboric acid is preferable.

The content of the boron compound, if contained, is preferably in the range of 20 to 2000 ppm, and more preferably 50 to 1000 ppm, in terms of the boron element. With the addition of boron within this range, torque variation in EVOH during melting by heating is suppressed. If the boron content is less than 20 ppm, this effect of adding the boron compound may be insufficient. If it exceeds 2000 ppm, gelation tends to occur, resulting in poor moldability.

It is also effective to add an alkali metal salt to the EVOH in an amount of 5 to 5000 ppm in terms of the alkali metal element in order to improve interlayer adhesions and compatibility. The added amount of the alkali metal salt is preferably in the range of 20 to 1000 ppm, and more preferably 30 to 500 ppm, in terms of the alkali metal element. Examples of the alkali metal include lithium, sodium, potassium, and the like. Examples of the alkali metal salt include aliphatic carboxylates, aromatic carboxylates, phosphates, and metal complexes of alkali metals. Specifically, they include sodium acetate, potassium acetate, sodium phosphate, lithium phosphate, sodium stearate, potassium stearate, a sodium salt of ethylenediaminetetraacetic acid, and the like. Among these, sodium acetate, potassium acetate, and sodium phosphate are preferable.

It is also preferable to add a phosphorus compound to the EVOH in an amount of 20 to 500 ppm, more preferably 30 to 300 ppm, and most preferably 50 to 200ppm, in terms of the phosphoric acid radicals. When a phosphorus compound is blended with the EVOH in the above range, the thermal stability of the EVOH can be improved. In particular, generation of gelled aggregates and coloring during long-duration melt molding can be suppressed.

There is no particular limitation regarding the kind of phosphorus compound added to the EVOH, and various kinds of acids such as phosphoric acid and phosphorous acid and salts thereof may be used. Phosphates may be in the form of primary phosphates, secondary phosphates, or tertiary phosphates, and there is no particular limitation regarding the cationic species of the phosphates. The phosphates are preferably alkali metal salts and alkaline-earth metal salts. Among these, it is preferable to add the phosphorus compound in the form of sodium dihydrogenphosphate, potassium dihydrogenphosphate, disodium hydrogenphosphate, or dipotassium hydrogenphosphate.

The melt flow rate (MFR) of the EVOH used in the present invention (210° C., 2160 g load; according to JIS K7210) is in the range of 0.1 to 100 g/10 min, more preferably 0.5 to 50 g/10 min, and even more preferably 1 to 30 g/10 mm.

In the present invention, it is also possible to blend to the EVOH a thermal stabilizer, an ultraviolet absorber, an antioxidant, a coloring agent, a filler, and other resins (e.g., polyamides and polyolefins) within a range not interfering with the objects of the present invention.

(Thermoplastic Resin (B))

The thermoplastic resin (B) contained in the resin composition of the present invention is characterized by having a carbon-carbon double bond and a functional group including a hetero atom. For the first and the second resin compositions of the present invention, there is no limitation regarding the kind of the thermoplastic resin (B), as long as it has the above-described characteristics and is a resin other than the polyvinyl alcohol resin (A). For the third and the fourth resin compositions of the present invention, there is no limitation regarding the kind of the thermoplastic resin (B), as long as it has the above-described characteristics.

The thermoplastic resin (B) contained in the resin composition of the present invention contains a carbon-carbon double bond, as described above. Since the carbon-carbon double bond reacts with oxygen efficiently, such a thermoplastic resin (B) has the oxygen scavenging function. In the present invention, the carbon-carbon double bond encompasses conjugated double bonds, but does not encompass multiple bonds contained in aromatic rings.

For the third and the fourth resin compositions of the present invention, the thermoplastic resin (B) should contain the carbon-carbon double bond in an amount of 0.0001 eq/g (equivalents/g) or more, preferably 0.0005 eq/g or more, and more preferably 0.001 eq/g or more. If the content of the carbon-carbon double bond is less than 0.0001 eq/g, the oxygen scavenging function of the resultant resin composition may not be sufficient. Also for the first and the second resin compositions of the present invention, it is preferable that the content of the carbon-carbon double bond is the above values or more.

The carbon-carbon-double bonds may be contained either in the main chain or the side chain of the thermoplastic resin (B), but it is preferable that the amount of the double bonds present in the side chains is larger than the amount of the double bonds present in the main chain (in other words, a larger number of groups having carbon-carbon double bonds exist in the side chains), because of the efficiency of reaction with oxygen. A double bond contained in a structural unit represented by formula (I) is preferable for the carbon-carbon double bond present in the side chains:

(I)

(wherein $R_1$ is a hydrogen atom or an alkyl group having 1 to 5 carbon atoms, $R_2$ is a hydrogen atom, an alkyl group having 1 to 10 carbon atoms, an aryl group, an alkylaryl group, an arylalkyl group or an alkoxy group, $R_3$ and $R_4$ are each independently a hydrogen atom, an alkyl group having 1 to 10 carbon atoms, an aryl group that may be substituted, —COOR$_5$, —OCOR$_6$, a cyano group or a halogen atom, $R_5$ and $R_6$ are each independently an alkyl group having 1 to 10 carbon atoms, an aryl group, an alkylaryl group, an arylalkyl group or an alkoxy group). The number of carbon atoms of the aryl group is preferably 6 to 10. The number of carbon atoms of the alkylaryl group and the arylalkyl group is preferably 7 to 11. The number of carbon atoms of the alkoxy group is preferably 1 to 10. Examples of the alkyl group include a methyl group, an ethyl group, a propyl group, and a butyl group. Examples of the aryl group include a phenyl group. Examples of the alkylaryl group include a tolyl group. Examples of the arylalkyl group include a benzyl group. Examples of the alkoxy group include a methoxy group and an ethoxy group. Examples of the halogen atom include chlorine.

Among the structural units represented by formula (I), a structural unit derived from a diene compound is preferable. This is because the thermoplastic resin having that structure can be easily produced. Examples of such a diene compound include isoprene, butadiene, 2-ethylbutadiene, and 2-butylbutadiene. One of these can be used, or two or more can be used in combination. Table 1 shows the relationship between an example of a diene compound and a kind of a group in the formula (I) derived from the diene compound.

TABLE 1

|  | $R_1$ | $R_2$ | $R_3$ | $R_4$ |
|---|---|---|---|---|
| Isoprene | CH$_3$ | H | H | H |
|  | H | CH$_3$ | H | H |
| Butadiene | H | H | H | H |
| 2-Ethyl butadiene | C$_2$H$_5$ | H | H | H |
|  | H | C$_2$H$_5$ | H | H |
| 2-Butyl butadiene | C$_4$H$_9$ | H | H | H |
|  | H | C$_4$H$_9$ | H | H |

Among these, a structural unit containing an alkyl group having 1 to 5 carbon atoms as $R_2$ is preferable because of the efficiency of reaction with oxygen, and a structural unit containing a methyl group (i.e., a structural unit derived from isoprene) as $R_2$ is more preferable. Isoprene is easily available and can be copolymerized with other monomers, so that this is preferable also in view of the production cost for the thermoplastic resin (B). Furthermore, butadiene is also preferable in that it is easy available and can be copolymerized with other monomers.

When the structural unit represented by formula (I) is derived from a diene compound, the ratio of the structural unit represented by formula (I) to all the structural units derived from the diene compound is preferably 10% or more, more preferably 20% or more, and even more preferably 30% or more. This ratio is made 10% or more by a generally known method in the art of causing anionic polymerization of the diene compound in an inactive organic solvent using a Lewis base as a cocatalyst.

In order to obtain the thermoplastic resin (B) having the structural unit represented by formula (I), when polymerizing monomers containing the diene compound, it is preferable to use a Lewis base as a cocatalyst. Examples of the Lewis base include ethers such as dimethyl ether, diethyl ether, methyl ethyl ether, and tetrahydrofran; glycol ethers such as ethylene glycol diethyl ether, and ethylene glycol dimethyl ether; tertiary amines such as N,N,N',N'-tetramethylethylenediamine (TMEDA) and triethylenediamine; ether-containing amines such as N-methyl morpholine and N-ethyl morpholine. The Lewis base is generally used in an amount 0.1 to 400 parts by weight with respect to 100 parts by weight of an initiator that will be described later.

The thermoplastic resin (B) used for the resin composition of the present invention is preferably a copolymer of an aromatic vinyl compound and the diene compound. When the thermoplastic resin (B) is such a copolymer, the carbon-carbon double bond moiety derived from the diene compound easily reacts with oxygen, so that the oxygen barrier properties and the oxygen scavenging function of the resultant resin composition can be improved. Furthermore, by adjusting the copolymerization ratio between the aromatic vinyl compound and the diene compound, the refractive index of the thermoplastic resin (B) can be made a desired value. Therefore it is possible to reduce the difference in the refractive index between the polyvinyl alcohol resin (A) and the thermoplastic resin (B), and therefore a product having excellent transparency can be obtained.

Examples of the aromatic vinyl compound include styrene, 1-vinylnaphthalene, 2-vinylnaphthalene, 3-vinylnaphthalene, 2-methylstyrene, 3-methylstyrene, 4-methylstyrene, 4-propylstyrene, 4-cyclohexylstyrene, 4-dodecylstyrene, 2-ethyl-4-benzylstyrene, and 4-(phenylbutyl)styrene. Among these, styrene is the most preferable in view of cost and ease of polymerization. As the diene compound, the above-described compounds can be used, for example.

The copolymer of the aromatic vinyl compound and the diene compound may be in any form of a random copolymer, a block copolymer, a graft copolymer, or a composite thereof. A block copolymer is preferable in view of the ease of production and the mechanical properties of the resultant thermoplastic resin (B), the ease of handling, and the oxygen scavenging function.

In the block copolymer, the molecular weight of the aromatic vinyl compound block is preferably 300 to 100000, more preferably 1000 to 50000, even more preferably 3000 to 50000. When the molecular weight of the aromatic vinyl compound block is less than 300, the melt viscosity of the thermoplastic resin (B) is low, and the moldability, the processability and the handling properties of the resultant resin composition may be degraded. Furthermore, the mechanical properties of a molded article that is formed from the resin composition may be poor. In addition, the dispersibility of the thermoplastic resin (B) to the polyvinyl alcohol resin (A) is degraded, and the transparency, the gas barrier properties and the oxygen scavenging function may be degraded. On the other hand, when the molecular weight of the aromatic vinyl compound block exceeds 100000, the melt viscosity of the thermoplastic resin (B) is high, so that the thermoplastisity is impaired. Therefore, the moldability and the processability of the resultant resin composition may be degraded. In addition, the dispersibility of the thermoplastic resin (B) to the polyvinyl alcohol resin (A) is degraded as above, and the transparency, the gas barrier properties and the oxygen scavenging function may be degraded.

The block form of the block copolymer is for example, $X(YX)_n$, $(XY)_n$ or the like, wherein X is an aromatic vinyl compound block, Y is a diene compound block, and n is an integer of 1 or more. Among these, a diblock copolymer and a triblock copolymer are preferable, and a triblock copolymer is more preferable in view of its mechanical properties. In particular, it is preferable that the aromatic vinyl compound block is a polystyrene block, and the diene compound block is a polyisopropylene block in view of cost and ease of polymerization.

There is no particular limitation regarding the method for producing the block copolymer, but anionic polymerization is preferable. Specifically, the following methods, but not limited to, can be used. The aromatic vinyl compound and the diene compound are copolymerized with an alkyl lithium compound as an initiator, and coupled by a coupling agent. Alternatively, the diene compound and the aromatic vinyl compound are sequentially polymerized with a dilithium compound as an initiator. As the alkyl lithium compound, alkyl lithium compounds with an alkyl group having 1 to 10 carbon atoms, such as methyl lithium, ethyl lithium, benzyl lithium, n-butyl lithium, sec-butyl lithium, tert-butyl lithium and the like are preferable.

As the coupling agent, dichloromethane, dibromomethane, dichloroethane, dibromoethane, and the like can be used. Examples of the dilithium compound include naphthalenedilithium, oligostyryldilithium and dilithiohexylbenzene. The initiator and the coupling agent can be used preferably in an amount of 0.01 to 0.2 parts by weight and 0.04 to 0.8 parts by weight with respect to 100 parts by weight of all the monomers used for polymerization.

As the solvent for production of the thermoplastic resin (B), organic solvents that are inactive with respect to the above-described initiators, coupling agents and the Lewis base can be used. Among these, a saturated hydrocarbon, a saturated cyclic hydrocarbon, and an aromatic hydrocarbon that have 6 to 12 carbon atoms are preferable. For example, hexane, heptane, octane, decane, cyclohexane, toluene, benzene, xylene, and the like can be used. The polymerization reaction of the monomer for production of the thermoplastic resin (B) is generally performed at a temperature range of −20 to 80° C. for 1 to 50 hours. Thus, the thermoplastic resin having a carbon-carbon double bond can be obtained.

The thermoplastic resin (B) used in the resin composition of the present invention has a functional group including a hetero atom, in addition to the carbon-carbon double bond, as described above. Since the present invention has a functional group including a hetero atom, the interface delamination strength can be improved, which will be described below.

In general, if different kinds of resins are forced to be blended by, for example, melt kneading, the adhesion at the interface (interface delamination strength) of the resins is low because these resins have no compatibility to each other. Therefore, it is an important object to improve the interface delamination strength of the different kinds of resins. As a result of the indepth research carried out by the present inventors to accomplish this object, it was found that when the thermoplastic resin (B) having a functional group including a hetero atom is blended with another resin, for example, a polyvinyl alcohol resin (A), the interface delamination strength of these resins can be improved and thus the compatibility of the polyvinyl alcohol resin (A) and the thermoplastic resin (B) can be improved significantly.

From the above point of view, in the present invention, the thermoplastic resin (B) has a carbon-carbon double bond, which contributes to the oxygen scavenging function, and a functional group including a hetero atom, which contributes to the compatibility of the resins. The reason why the interface delamination strength of the polyvinyl alcohol resin (A) and the thermoplastic resin (B) is improved by using the thermoplastic resin (B) having a functional group including a hetero atom is not clear, but it seems that the functional group including a hetero atom contained in the thermoplastic resin (B) reacts or interacts with a hydroxyl group contained in the polyvinyl alcohol resin (A), so that a graft copolymer or a similar structure is formed and this structure contributes to the improvement of the compatibility of the polyvinyl alcohol resin (A) and the thermoplastic resin (B).

A multilayered container such as a bottle including a layer made of a resin composition that contains the polyvinyl alcohol resin (A) and the thermoplastic resin (B) and a layer made of a thermoplastic polyester, in which the layers are in direct contact with each other, exhibits a high impact delamination resistance. The reason why the high impact delamination resistance of the multilayered container is improved by using such a resin composition is not clear. But, it seems that in addition to the improved compatibility of the polyvinyl alcohol resin (A) and the thermoplastic resin (B), a reaction or an interaction between the thermoplastic polyester and the functional group including a hetero atom contained in the thermoplastic resin (B) improves the impact delamination resistance.

As the hetero atom of the functional group contained in the thermoplastic resin (B), atoms that are selected from Groups IV, V and VI of the periodic table and have an electronegativity in the following range are preferred:

$$0.41 \leq Xp/N \leq 0.60$$

where Xp is the electronegativity of the atom and refers to Pauling's electronegativity (refer to e. g., Chemical Manual, Basics, modified second edition, p. 1288, published by Maruzen) in the present invention, and N refers to the number of the group in the periodic table for the atom.

Examples of such a hetero atom include nitrogen, oxygen, silicon, phosphorus, sulfur, germanium, tin, and lead. Among these, nitrogen, oxygen, sulfur, tin and lead are preferable, and oxygen and sulfur are more preferable. Boron is also preferable, although it is not included in the above-described atom groups.

The following groups can be employed as the functional group including a hetero atom contained in the thermoplastic resin (B) of the present invention:

<1> Active hydrogen-containing polar groups —SO$_3$H, —SO$_2$H, —SOH, —NH$_2$, —NHR, >C=NH, —CONH$_2$, —CONHR, —CONH—, —OH, and —SH <2> Nitrogen-containing and active hydrogen-free polar groups —NR$_2$, —NR—, >C=N—, —CN, —NCO, —OCN, —SCN, —NO, —NO$_2$, —NCS, —CONR$_2$, and —CONR—

<3> Epoxy group or thioepoxy group-containing polar groups

<4> Carbonyl group or thiocarbonyl group-containing polar groups —CHO, —COOH, —COOR, —COR, >C=O, >C=S, —CHS, —CSOR, and —CSOH <5> Phosphorus-containing polar groups —P(OR)$_2$, —P(SR)$_2$, —PO(OR)$_2$, —PO(SR)$_2$, —PS(OR)$_2$, —PS(SR)$_2$, —PO(SR)(OR), and —PS(SR)(OR)

<6> M-containing polar groups (M is any one of Si, Ge, Sn, and Pb) —MX$_3$, —MX$_2$R, —MXR$_2$, and —MR$_3$ <7> Boron-containing polar groups Boronic acid group or boron-containing groups that can be converted to a boronic acid group in the presence of water (In the above general formulae, R is an alkyl group, a phenyl group or an alkoxy group, and X is a halogen atom.)

The thermoplastic resin (B) can contain one kind of these functional groups or can contain two or more. Among these functional groups, a hydroxyl group of the active hydrogen-containing polar groups <1>, a carbonyl group of <4>, a trialkoxysilyl group, which is an M-containing polar group <6> (M is any one of Si, Ge, Sn and Pb), and a boron-containing polar group <7> are preferable.

Among these, the groups of <1> to <6> can be present either in the main chain, a side chain or the terminal of the thermoplastic resin (B). In view of the compatibility of the thermoplastic resin (B) with another resin, for example, the polyvinyl alcohol resin (A), the effect on the interface delamination strength, and the ease of production, it is preferable that the functional group is present at the terminal of the thermoplastic resin (B). The boron-containing polar group of <7> is preferably present in a side chain of the thermoplastic resin (B) in view of the compatibility of the thermoplastic resin (B) with another resin (e.g., the polyvinyl alcohol resin (A)).

When the functional group including the hetero atom is a boron-containing polar group <7>, the boron-containing polar group is preferably a boronic acid group or a boron-containing group that can be converted to a boronic acid group in the presence of water, as described above. The boronic acid group is the residue of boric acid, in which an OH group of the boric acid is removed, and expressed by formula (II) below.

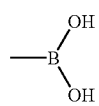

(II)

"Boron-containing group that can be converted to a boronic acid group in the presence of water" refers to a boron-containing group that can be converted to the boronic acid group expressed by formula (II) by being hydrolyzed in the presence of water. More specifically, it means a functional group that can be converted to a boronic acid group when a hydrolysis is conducted using water alone or a mixture of water and an organic solvent (toluene, xylene, acetone, etc.) as a solvent at 25 to 150° C. for 10 minutes to 2 hours. Typical examples of such a functional group include a boronic acid ester group expressed by formula (III), a boronic anhydride group expressed by formula (IV), and a boronate group expressed by formula (V).

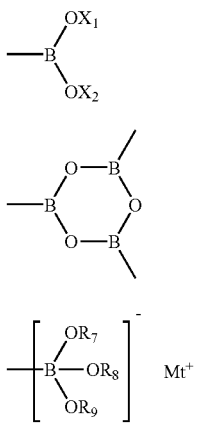

(III)

(IV)

(V)

where $X_1$ and $X_2$ are a hydrogen atom, aliphatic hydrocarbon groups (e.g., linear or branched alkyl groups or alkenyl groups having 1 to 20 carbon atoms), alicyclic hydrocarbon groups (e.g., cycloalkyl groups or cycloalkenyl groups), or aromatic hydrocarbon groups (e. g., phenyl group or biphenyl group), and $X_1$ and $X_2$ can be the same or different from each other. However, $X_1$ and $X_2$ are not both hydrogen atoms at the same time. $X_1$ and $X_2$ can be bonded to each other. $R_7$, $R_8$, and $R_9$ are a hydrogen atom, aliphatic hydrocarbon groups, alicyclic hydrocarbon groups, or aromatic hydrocarbon groups as employed for $X_1$ and $X_2$, and can be the same or different from each other. Mt represents an alkali metal. $X_1$, $X_2$, $R_7$, $R_8$, and $R_9$ can include other groups, for example, a carboxyl group, a halogen atom or the like.

Specific examples of the boronic acid ester group expressed by formula (III) include boronic acid dimethyl ester group, boronic acid diethyl ester group, boronic acid dipropyl ester group, boronic acid diisopropyl ester group, boronic acid dibutyl ester group, boronic acid dihexyl ester group, boronic acid dicyclohexyl ester group, boronic acid ethylene glycol ester group, boronic acid propylene glycol ester group, boronic acid 1,3-propane diol ester group, boronic acid 1,3-butane diol ester group, boronic acid neopentyl glycol ester group, boronic acid catechol ester group, boronic acid glycerin ester group, and boronic acid trimethylolethane ester group.

As the boronate group expressed by the general formula (V) above, alkali metal boronate groups can be used. Specific examples thereof include sodium boronate groups and potassium boronate groups.

There is no limitation regarding the method for producing the thermoplastic resin (B) having the carbon-carbon double bond as described above and the functional group as described above. For example, the following methods can be employed: 1) adding a monomer having the functional group (or a monomer that can form the functional group) as a copolymerizable component when polymerizing monomers that can form the carbon-carbon double bond in a molecule; 2) utilizing an initiator having the functional group (or an initiator that can form the functional group) when polymerizing monomers that can form the carbon-carbon double bond in a molecule; 3) subjecting monomers that can form the carbon-carbon double bond in a molecule to living polymerization and utilizing a monomer having the functional group (or a monomer that can form the functional group) as a terminator; and 4) polymerizing monomers that can form the carbon-carbon double bond in a molecule to provide a polymer, and bonding a monomer having the functional group (or a monomer that can form the functional group) to the polymer by a reaction. Among these methods, in particular, the methods 3) and 4) are preferably employed.

For example, the thermoplastic resin (B) can be prepared by the method 3) as follows: First, one or two or more kinds of monomers that can anionically polymerizable and can form the carbon-carbon double bond in a molecule are polymerized using an organic alkali metal as an initiator so that a polymer having an alkali metal at its terminal is formed, and then a monomer that can react with the alkali metal and has the functional group (or a monomer that can form the functional group) is reacted therewith as a terminator (i.e., an end treatment agent).

As the terminal treatment agent that can be used in such a method, the following compounds can be exemplified: (i) compounds having a carbonyl group; (ii) compounds having a thiocarbonyl group; (iii) compounds having an aldehyde group; (iv) compounds having a thioaldehyde group; (v) compounds having a carboxylic acid ester group; (vi) compounds having an acid anhydride group; (vii) compounds having an acid halide group; (viii) compounds having an amide group; (ix) compounds having a sulfonic acid group; (x) compounds having a sulfonic acid ester group; (xi) compounds having a phosphoric acid group; (xii) compounds having a phosphoric acid ester group; (xiii) compounds having an amino group; (xiv) compounds having an imino group; (xv) compounds having a carbodiimide group; (xvi) compounds having a nitrile group; (xvii) compounds having a pyridyl group; (xviii) compounds having a quinoline ring; (xix) compounds having an epoxy group; (xx) compounds having a thioepoxy group; (xxi) compounds having an isocyanato group; (xxii) compounds having an isothiocyanato group; (xxiii) cyanamides; (xxiv) aziridine derivatives; (xxv) compounds other than the above compounds and having a tertiary amino group or a substituted imino group; (xxvi) silicon compounds; (xxvii) tin compounds and the like. Furthermore, carbon dioxide (carbonic acid gas) also can be used preferably as the end treatment agent.

As the compounds having a carbonyl group (i), which is one of the above-described end treatment agents, the following compounds can be used: acetone, methyl ethyl ketone, diethyl ketone, methyl propyl ketone, isopropyl methyl ketone, dipropyl ketone, acetophenone, benzophenone, 4,4'-dimethoxybenzophenone, acetylcyclohexane, cyclopentyl ketone, 1-cyclooctyl-2-methyl-1-butanone, 1-phenyl-5-cyclohexyl-3-pentanone, 3-decanone, 2,4-dimethyl-3-heptanone, cyclohexanone, cylcodecanone, 3-phenylcyclooctanone, cyclopentanone and the like.

Examples of the compounds having a thiocarbonyl group (ii) include 4,4'-dimethoxythiobenzophenone and 4,4'-bis(dimethylamino)thiobenzophenone.

Examples of the compounds having an aldehyde group (iii) include monoaldehydes such as acetaldehyde, propionaldehyde, isobutyrylaldehyde, n-caproaldehyde, valeraldehyde, benzaldehyde, decanal, eicosanal, 2-phenylbutanal, 3-methyl benzaldehyde, 4-cyclohexyl benzaldehyde, cyclohexanecarboxyaldehyde, and 3-phenylcyclohexanecarboxyaldehyde; and polyaldehydes such as 1,4,7-naphthenetricarboxyaldehyde, 1,7,9-anthracenetricarboxyaldehyde, and 1,1,5-pentanetricarboxyaldehyde.

Examples of the compounds having a thioaldehyde group (iv) include acetothioaldehyde, propionthioaldehyde, isobutylthioaldehyde, and n-caprothioaldehyde.

Examples of the compounds having a carboxylic acid ester group (v) include an ester of a monobasic acid or a dibasic acid and an alcohol, and a lactone. Examples of the monobasic acid constituting the ester include acetic acid, butyric acid, caproic acid, lauric acid, palmitic acid, stearic acid, cyclohexylpropionic acid, cyclohexylcaproic acid, benzoic acid, and phenylbutyric acid. Examples of the dibasic acids include oxalic acid, maleic acid, malonic acid, fumaric acid, succinic acid, glutaric acid, adipic acid, pimelic acid, suberic acid, sebacic acid, itaconic acid, phthalic acid, isophthalic acid, terephthalic acid, naphthalic acid, and diphenic acid. Examples of the alcohol constituting the ester include methyl alcohol, ethyl alcohol, n-propyl alcohol, isopropyl alcohol, sec-butyl alcohol, tert-butyl alcohol, amyl alcohol, hexyl alcohol, octyl alcohol, phenol, and cresol.

Examples of the lactone include β-propiolactone, δ-valerolactone, ε-caprolactone, and lactones corresponding to the following acids: 2-methyl-3-hydroxypropionic acid, 3-hydroxypelargonic acid, 2-dodecyl-3-hydroxypropionic acid, 2-cyclopentyl-3-hydroxypropionic acid, 3-phenyl-3-hydroxypropionic acid, 2-naphthyl-3-hydroxypropionic acid, 2-(n-butylcyclohexyl)-3-hydroxypropionic acid, 2-phenyl-3-hydroxy tridecanoic acid, 2-(2-methylcyclopentyl)-3-hydroxypropionic acid, 2-methylphenyl-3-hydroxypropionic acid, 3-benzyl-3-hydroxypropionic acid, 2,2-dimethyl-3-hydroxypropionic acid, 2-methyl-5-hydroxyvaleric acid, 3-cyclohexyl-5-hydroxyvaleric acid, 4-phenyl-5-hydroxyvaleric acid, 2-heptyl-4-cyclopentyl-5-hydroxyvaleric acid, 2-methyl-3-phenyl-5-hydroxyvaleric acid, 3-(2-cyclohexylethyl)-5-hydroxyvaleric acid, 2-(2-phenylethyl)-4-(4-cyclohexylbenzyl)-5-hydroxyvaleric acid, benzyl-5-hydroxyvaleric acid, 3-ethyl-5-isopropyl-6-hydroxycaproic acid, 2-cyclopentyl-4-hexyl-6-hydroxycaproic acid, 3-phenyl-6-hydroxycaproic acid, 3-(3,5-diethylcyclohexyl)-5-ethyl-6-hydroxycaproic acid, 4-(3-phenylpropyl)-6-hydroxycaproic acid, 2-benzyl-5-isobutyl-6-hydroxycaproic acid, 7-phenyl-6-hydroxy-6-octenoic acid, 2,2-di(1-cyclohexenyl)-5-hydroxy-5-heptenoic acid, 2,2-dipropenyl-5-hydroxy-5-heptenoic acid, and 2,2-dimethyl-4-propenyl-3-hydroxy-3,5-heptadienoic acid.

Examples of the compounds having an acid anhydride group (vi) include an anhydride of saturated or unsaturated aliphatic, aromatic, or alicyclic polycarboxylic acid. Specific examples of the polycarboxylic acid include aliphatic polycarboxylic acids such as maleic acid and succinic acid; aromatic polycarboxylic acids such as phthalic acid, isophthalic acid, terephthalic acid, pyromellitic acid, 1,2,5,6-naphthalenetetracarboxylic acid, 2,3,6,7-naphthalenetetracarboxylic acid, 2,2',3,3'-diphenyltetracarboxylic acid, 3,4,9,10-perylenetetracarboxylic acid, 3,3',4,4'-diphenyltetracarboxylic acid, 3,3',4,4'-benzophenonetetracarboxylic acid, and 2,3-bis(3,4-dicarboxyphenyl)propane, bis(3,4-dicarboxyphenyl)sulfone, bis(3,4-dicarboxyphenyl)ether; and alicyclic polycarboxylic acids such as tetrahydrophthalic acid and nadic acid. As the anhydride, either monoanhydrides or dianhydrides can be used.

Examples of the compounds having an acid halide group (vii) include a halide of the monobasic acid and the dibasic acid described in the above item (v).

Examples of the compounds having an amide group (viii) include compounds having at least one —CO—N< bond or —CS—N< bond in their molecule. Examples of such a compound include a linear compound having the above-described bond or a cyclic compound in which the above-described bond is incorporated into the cyclic structure. Specific examples of the linear compound having the above-described bond include amides such as N,N-dimethylformamide, N,N-dimethylthioformamide, N,N-dimethyl-N',N'-(p-dimethylamino)benzamide, N-ethyl-N-methyl-8-quinolinecarboxyamide, N,N'-dimethylnicotinamide, N,N-dimethylmethacrylamide, N-methylphthalimide, N-phenylphthalimide, N-acetyl-ε-caprolactam, N-methyl-ε-caprolactam, N,N,N',N'-tetramethylphthalamide, 10-acetylphenoxazine, 3,7-bis(diethylamino)-10-benzoylphenothiazine, 10-acetylphenothiazine, 3,7-bis(dimethylamino)-10-benzoylphenothiazine, and N-ethyl-N-methyl-8-quinolinecarboxamide; and linear urea compounds such as N,N'-dimethylurea, N,N'-diethylurea, N,N'-dimethylethyleneurea, N,N,N',N'-tetramethylurea, N—N,N'N'-tetramethylthiourea, N,N-dimethyl-N,N'-diethylurea, and N,N-dimethyl-N',N'-diphenylurea. Among these, N,N-dimethylformamide, N,N-dimethylthioformamide, N,N,N',N'-tetramethylurea, N,N,N',N'-tetramethylthiourea, N,N'-dimethylnicotinamide, N,N-dimethyl-N',N'-(p-dimethylamino)benzamide, 3,7-bis(dimethylamino)-10-benzoylphenothiazine and N-ethyl-N-methyl-8-quinolinecarboxamide are preferable.

Examples of the latter, that is, the cyclic compound in which the above-described bond is incorporated into the cyclic structure, include cyclic urea compounds and N substituted lactams. Examples of cyclic urea compounds include 1,3-dimethyl-2-imidazolidinone, 1,3-diethyl-2-imidazolidinone, 1,3-dipropyl-2-imidazolidinone, 1-methyl-3-ethyl-2-imidazolidinone, 1-methyl-3-(2-methoxyethyl)-2-imidazolidinone, 1,3-di(2-ethoxyethyl)-2-imidazolidinone, 1,3-dimethylethylenethiourea, N,N,N',N''-trimethylisocyanuric acid, and N,N',N''-triethylisocyanuric acid.

Examples of the N-substituted lactams include N-methylpyrrolidone, N-ethylpyrrolidone, N-phenylpyrrolidone, N-methyl-ε-caprolactam, N-ethyl-ε-caprolactam, N-acetyl-ε-caprolactam, caffeine, 1-phenyl-3-methyl pyrazolone, antipyrine, N-dimethylaminoantipyrine, N-phenylpyrazolone, N,N'-diphenyl indigo, cryptopine, and tropinone.

Among the cyclic compounds in which the above-described bond is incorporated into the cyclic structure, N-methylpyrrolidone, N-ethylpyrrolidone, 1,3-dimethyl-2-imidazolidinone, 1,3-diethyl-2-imidazolidinone, N-methyl-ε-caprolactam, N-acetyl-ε-caprolactam, and N,N',N''-trimethylisocyanuric acid are preferable.

Examples of the compounds having a sulfonic acid group (ix) include benzenesulfonic acid, toluenesulfonic acid, and anthraquinonesulfonic acid.

Examples of the compounds having a sulfonic acid ester group (x) include esters of the compounds having a sulfonic acid group (ix) as above and alcohols.

Examples of the compounds having a phosphoric acid group (xi) include methylphosphonic acids and ethylphosphonic acid.

Examples of the compounds having a phosphoric acid ester group (xii) include trialkyl or triaryl phosphite expressed by the general formula $(RO)_3P$, trialkyl or triaryl phosphate expressed by the general formula $(RO)_3P \rightarrow O$, trialkyl or triaryl thiophosphite expressed by the general formula $(RS)_3P$, and trialkyl or triaryl thiophosphate expressed by the general formula $(RO)_3P \rightarrow S$. In the above formulae, R is an alkyl group such as a methyl group, an ethyl group, a butyl group, a hexyl group, a 2-ethylhexyl group, a cyclohexyl group, a nonyl group, a decyl group, a lauryl group, a tridecyl group, and a stearyl group; a phenyl group; or a substituted phenyl group having the above-described alkyl group.

Examples of the compounds having an amino group (xiii) include methylamine, ethylamine and aniline.

Examples of the compounds having an imino group (xiv) include benzylideneaniline, anisalaniline, 4-methoxybenzylidene-4-n-butylaniline, 4-methoxybenzylidene-4-acetoxyaniline, benzylidene ethylamine, benzylideneazine, N-trimethylsilylbenzylideneamine, N-triphenylsilyl benzylideneamine, N-trimethylsilyl-(1-phenylbenzylidene) amine, N-butylidenebenzenesulfenamide, N-isopropylidenebenzenesulfenamide, N-benzylidenebenzenesulfenamide, N-ethylidenebenzenesulfenamide, N-(α-phenylbenzylidene)benzenesufenamide, N-(α-methylbenzylidene)benzenesulfenamide, and N-cylcohexyl-2-benzothiazylsulfenamide. Among these, benzylideneaniline, anisalaniline, 4-methoxybenzylidene-4-n-butylaniline, 4-methoxybenzylidene-4-acetoxyaniline, and N-cylcohexyl-2-benzothiazylsulfenamide are preferable.

Examples of the compounds having a carbodiimide group (xv) include dimethylcarbodiimide, diethylcarbodiimide, dipropylcarbodiimide, dibutylcarbodiimide, dihexylcarbodiimide, N,N'-dicyclohexylcarbodiimide, dibenzylcarbodiimide, N,N'-diphenylcarbodiimide, methylpropyl carbodiimide, butylcyclohexylcarbodiimide, ethylbenzylcarbodiimide, propylphenylcarbodiimide, and phenylbenzylcarbodiimide. Among these, N,N'-dicyclohexylcarbodiimide and N,N'-diphenylcarbodiimide are preferable.

Examples of the compounds having a nitrile group (xvi) include acetonitrile, propionitrile, benzonitrile, phenylacetonitrile, adiponitrile, N,N-dimethylaminobenzonitrile, and N,N-dimethylaminophenylacetonitrile.

Examples of the compounds having a pyridyl group (xvii) include 2-vinylpyridine, 4-vinylpyridine, 4-benzoylpyridine, 2-acetylpyridine, and 4-pyridinecarboxylic acid methyl ester.

Examples of the compounds having a quinoline ring (xviii) include methyl quinoline and quinolinecarboxylic acid.

Examples of the compounds having an epoxy group (xix) include epoxy compounds such as ethylene oxide, propylene oxide, butadiene oxide, butene oxide, cyclohexene oxide, vinylcyclohexene oxide, styrene oxide, allyl glycidyl ether, epichlorohydrin, and epibromohydrin; epoxidized hydrocarbon polymers such as epoxidized polybutadiene; and epoxidized vegetable oil such as epoxidized soybean oil and epoxidized linseed oil. Among these, ethylene oxide, propylene oxide, butadiene oxide, and butene oxide are preferable.

Examples of the compounds having a thioepoxy group (xx) include thioepoxy compounds that correspond to the above-listed epoxy compounds in which the oxygen atom of the compound is substituted with a sulfur atom.

Examples of the compounds having an isocyanato group (xxi) include ethyl isocyanato, n-butyl isocyanate, n-decyl isocyanate, 2-(4-methylcyclohexyl)ethyl isocyanate, methyl isocyanate, propyl isocyanate, phenyl isocyanate, benzyl isocyanate, p-tolyl isocyanate, n-pentyl isocyanate, 2-hexyl isocyanate, xylyl isocyanate, diphenyl ether isocyanate, triphenylmethane triisocyanate, benzene-1,2,4-triisocyanate, naphthalene-1,3,7-triisocyanate, m- or p-phenylenediisocyanate, diphenylmethane diisocyanate, dianisidine diisocyanate, isophorone diisocyanate, tolylene diisocyanate, hexamethylene diisocyanate, and pentamethylene diisocyanate.

Examples of the compounds having an isothiocyanato group (xxii) include isothiocyanate compounds that correspond to the above-listed isocyanate compounds, in which the oxygen atom of the compounds is substituted with a sulfur atom.

The cyanamides (xxiii) have at least one >N—C≡N bond in its molecule. Specific examples thereof include dimethyl cyanamide, diethyl cianamide, dipropyl cyanamide, dibutyl cyanamide, dihexyl cyanamide, dicyclohexyl cyanamide, dibenzyl cyanamide, diphenyl cyanamide, methyl propyl cyanamide, butylcyclohexyl cyanamide, ethylbenzyl cyanamide, propylphenyl cyanamide, and phenylbenzyl cyanamide. Among these, dicyclohexyl cyanamide and diphenyl cyanamide are preferable.

Examples of the aziridine derivatives (xxiv) include tri (1-aziridinyl)phosphine oxide, tri(2-methyl-1-aziridinyl) phosphine oxide, tri(2-ethyl-3-decyl-1-aziridinyl)phosphine sulfide, tri(2-phenyl-1-aziridinyl)phosphine oxide, tri(2-methyl-3-cyclohexyl-1-aziridinyl)phosphine sulfide, 2,4,6-tri (aziridinyl)1,3,5-triazine, 2,4,6-tri(2-methyl-1-aziridinyl)1, 3,5-triazine, 2,4,6-tri(1-aziridinyl)2,4,6-triphospha-1,3,5-triazine, and 2,4,6-tri(2-methyl-n-butyl-aziridinyl)2,4,6-triphospha-1,3,5-triazine. Among these, di(2-methyl-1-aziridinyl)phenylphosphine oxide, tri(2-methyl-1-aziridinyl)phenylphosphine oxide, and 2,4,6-tri(aziridinyl) 1,3,5-triazine are preferable.

The compounds other than the above compounds and having a tertiary amino group or a substituted imino group (xxv) contain at least one specific functional group having a reactivity with an alkali metal at the terminal of the polymer obtained by the above-mentioned anionic polymerization and at least one tertiary amino group or substituted imino group. These compounds can react with the alkali metal at the terminal of the polymer so that the residue of the compounds binds to the terminal of the polymer. The tertiary amino group is a functional group expressed by the general formula (VI) below:

(VI)

where $R_5$ and $R_6$ are each independently an alkyl group having 1 to 22 carbon atoms, a cycloalkyl group having 4 to 22 carbon atoms, an aryl group having 6 to 22 carbon atoms, a substituted aryl group, or an arylalkyl group. The substituted imino group is a functional group expressed by the general formula >N—$R_5$, where $R_5$ is the same as above.

The specific functional group having a reactivity with an alkali metal at the terminal of the polymer is a functional group expressed by either one of the following general formulae:

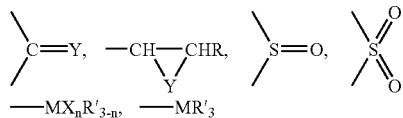

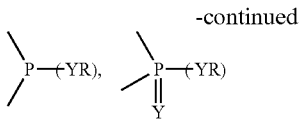

where R is hydrogen, an alkyl group having 1 to 22 carbon atoms, a cycloalkyl group having 4 to 22 carbon atoms, an aryl group having 6 to 22 carbon atoms, a substituted aryl group, or an arylalkyl group, R' is hydrogen, an alkyl group having 1 to 22 carbon atoms, a cycloalkyl group having 4 to 22 carbon atoms, an aryl group having 6 to 22 carbon atoms, a substituted aryl group, or an arylalkyl group or an alkoxy group, M is a silicon atom or a tin atom, X is a halogen atom, Y is an oxygen atom or a sulfur atom, and n is an integer of 1 to 3. Among these, a carbonyl group, a thiocarbonyl group, ester groups, thioester groups, a formyl group, a thioformyl group, an epoxy group, a thioepoxy group, a sulfinyl group, a sulfonyl group, a phosphite group, a thiophosphite group, a phosphate group, and a thiophosphate group are preferable.

Specific examples of the above compounds include 4,4'-bis(dimethylamino)benzophenone, 4,4'-bis(diethylamino) benzophenone, 4,4'-bis(dibutylamino)benzophenone, 4-dimethylaminobenzophenone, 4,4'-bis(dimethylamino)thiobenzophenone, 4,4'-bis(diethylamino)thiobenzophenone, 4,4'-bis(dibutylamino)thiobenzophenone, 4-dimethylaminothiobenzophenone, p-dimethylaminobenzalacetophenone, 1,3-bis(4'-dimethylaminobenzal)acetone, malachite green lactone, crystal violet lactone, 3-diethylamino-6-methylfluoran, 3-diethylamino-6-methyl-7-anisfluoran, tropinone, cryptopine, hygrine, hydrastine, lobelanine, tetraglycidyl metaxylenediamine, tetraglycidyl-1,3-bisaminomethylcyclohexane, tetraglycidylaminodiphenylmethane, triglycidyl-p-aminophenol, triglycidyl-m-aminophenol, diglycidylaniline, diglycidylorthotoluidine, 2-dimethylaminopropanesultone, 2-diethylaminobutanesultone, triethoxy-(4-dimethylaminobutyl)silane, dimethylaminoethyl acrylate, diethylaminoethyl acrylate, and dioctylaminoethyl acrylate. Furthermore, compounds shown by the general formula (VII) below can be used preferably.

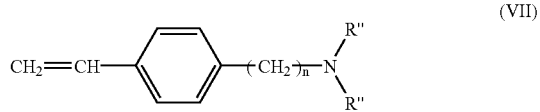

(VII)

where R" is an alkyl group having 1 to 22 carbon atoms, a cycloalkyl group, an arylalkyl group, an aryl group or a substituted aryl group, and n is an integer of 0 to 6. Examples of such a compound include m- or p-(2-dimethylaminoethyl) styrene, m- or p-(2-diethylaminoethyl)styrene, dibutylaminoethylstyrene, dioctylaminoethylstyrene, di(2-ethylhexyl) aminoethyl styrene, and dioctadecylaminoethylstyrene.

As the compound having a tertiary amino group of (xxv) as described above, the following compounds are preferable: 4,4'-bis(dimethylamino)benzophenone, 4,4'-bis(diethylamino)benzophenone, 4,4'-bis(diethylamino)thiobenzophenone, p-dimethylaminobenzalacetophenone, 1,3-bis(4'-dimethylaminobenzal)acetone, p-(2-dimethylaminoethyl)styrene, m-(2-dimethylaminoethyl)styrene, p-(2-diethylaminoethyl)styrene and m-(2-diethylaminoethyl)styrene.

As the silicon compounds (xxvi), compounds having a hydrolysable organic functional group other than halogen are preferable. Examples thereof include tetraethoxysilane, trimethoxymonochlorosilane, triethoxymonochlorosilane, triethoxymonobromosilane, diethoxymonochloromonomethylsilane, triethoxymonomethylsilane, trimethoxymonomethylsilane, diethoxydimethylsilane, dimethoxydimethylsilane, methyltriacetoxysilane, chloromethyltriethoxysilane, 3-chloropropyltriethoxysilane, 3-trimethoxysilylpropyl chloride, β-(3,4-epoxycyclohexyl) ethyltrimethoxysilane, γ-glycidoxypropyltrimethoxysilane, γ-glycidoxypropylmethyldiethoxysilane, γ-glycidoxypropyltriethoxysilane, 3-iodopropyltrimethoxysilane, and 3-isocyanatopropyltriethoxysilane. Among these, trialkoxysilane compounds such as triethoxymonochlorosilane, trimethoxymonochlorosilane, triethoxymonobromosilane, γ-glycidoxypropyltrimethoxysilane, γ-glycidoxypropyltriethoxysilane, 3-iodopropyltrimethoxysilane, 3-isocyanatopropyltriethoxysilane, and 3-trimethoxysilylpropyl chloride are preferable.

Examples of the tin compounds (xxvii) include tin tetrachloride, monobutyltin trichloride, tin tetramethoxide, trimethyltin chloride, tributyltin chloride, trioctyltin chloride, tributyltin bromide, dibutyltin bromide, dioctyltin bromide, phenyl tributyl tin, tributyltin methoxide, benzyl tributyl tin, diphenyl dibutyl tin, dibutyltin dimethoxide, dibenzyl dibutyl tin, tributyltin phenoxide, dibutyltin diphenoxide, tricyclohexyltin chloride, dicyclohexyltin dichloride, and tridecyltin chloride.

As described above, among the functional groups including the hetero atom contained in the thermoplastic resin (B), a hydroxyl group, a trialkoxysilyl group and a carbonyl group are preferable. In order to introduce such a functional group, it is preferable to use at least one selected from the group consisting of the compounds having an epoxy group (xix), trialkoxysilane compounds of the silicon compounds (xxvi) and carbon dioxide as the end treatment agent. A treatment with such an end treatment agent can provide a polymer that contains a desired functional group having a hetero atom at its molecular terminal.

The end treatment agent is used generally in a ratio of 0.5 to 2 mols, preferably 0.7 to 1.5 mols, and more preferably 0.9 to 1.3 mols, with respect to one mol of the alkali metal located at the terminal of the polymer.

Thus, employing the above-mentioned method 3), the thermoplastic resin (B) having the functional group including the hetero atom at its terminal and having the carbon-carbon double bond can be obtained. In order to exhibit the effect of the compatibility as described above, the thermoplastic resin (B) preferably contains at least 0.15 functional groups per molecule of the thermoplastic resin (B), more preferably at least 0.3 functional groups, and even more preferably 0.5 functional groups. During the above-described reaction, a coupling reaction may occur between polymer molecules, depending on the conditions such as the type of the end treatment agent, the structure of the polymer, the solvent used for polymerization, the reaction temperature, and the reaction apparatus. In this case, the functional group contained in the end treatment agent is introduced to the main chain of the polymer molecule.

The method 4) of polymerizing monomers that can form the carbon-carbon double bond in a molecule to provide a polymer, and bonding a monomer having the functional group (or a monomer that can form the functional group) to the polymer by a reaction is useful, for example, as a method for producing the thermoplastic resin (B) having a boron-containing polar group <7>.

For example, a thermoplastic resin having a carbon-carbon double bond is prepared beforehand, and is reacted with a borane complex and a boric acid trialkyl ester in a nitrogen atmosphere so that a thermoplastic resin having a boronic acid dialkyl ester group is obtained. Then, water or an alcohol is reacted therewith, if necessary, so that the boron-containing functional group is introduced to the carbon-carbon double bond of the thermoplastic resin by an addition reaction. Thus, the thermoplastic resin (B) having the boron-containing polar group can be obtained. In this production method, if a thermoplastic resin having a double bond at its terminal is used as a raw material, a thermoplastic resin having a boron-containing polar group at its terminal can be obtained. If a thermoplastic resin having a double bond at its side chain or main chain is used as a raw material, a thermoplastic resin having a boron-containing polar group at its side chain can be obtained.

Preferable examples of the borane complex used for the above reaction include borane-tetrahydrofuran complex, borane-dimethyl sulfide complex, borane-pyridine complex, borane-trimethylamine complex, and borane-triethylamine complex. Among those, borane-trimethylamine complex and borane-triethylamine complex are more preferable. The amount of the borane complex to be employed is preferably ⅓ mols to 10 mols with respect to one mol of the carbon-carbon double bond of the thermoplastic resin.

Preferable examples of the boric acid trialkyl ester include boric acid lower alkyl esters such as trimethyl borate, triethyl borate, tripropyl borate, and tributyl borate. The amount of boric acid trialkyl ester to be used is preferably 1 mol to 100 mols with respect to one mol of the carbon-carbon double bond of the thermoplastic resin. It is not necessary to use a solvent, but if a solvent is used, a saturated hydrocarbon solvent such as hexane, heptane, octane, decane, dodecane, cyclohexane, ethylcyclohexane, and decalin are preferable.

The reaction temperature is generally in the range from 25 to 300° C., preferably 100 to 250° C., and the reaction is performed at a temperature in this range for 1 min to 10 hours, preferably 5 min to 5 hours.

The boronic acid dialkyl ester group introduced to the thermoplastic resin by the above-described reaction can be converted to a boronic acid group by hydrolysis by a method generally utilized in the art. Alternatively, the boronic acid dialkyl ester group can be converted to a desired boronic acid ester group by transesterification with an alcohol by a regular method. Furthermore, the boronic acid dialkyl ester group can be converted to a boronic anhydride group by heating for dehydration, or converted to a boronate group by being reacted with a metal hydroxide or a metal alcoholate by a regular method.

The conversion of the boron-containing functional group as described above is performed, in general, using an organic solvent such as toluene, xylene, acetone and ethyl acetate. Examples of the alcohol include monohydric alcohols such as methanol, ethanol, and butanol; polyhydric alcohols such as ethylene glycol, propylene glycol, 1,3-propanediol, 1,3-butanediol, neopentyl glycol, glycerin, trimethylolethane, pentaerythritol, and dipentaerythritol. Examples of the metal hydroxide include hydroxides of alkali metals such as sodium and potassium. Examples of the metal alcoholate include metal alcoholate formed from a metal and the above-listed alcohol. These substances are not limited to those listed above. Their amounts are generally 1 to 100 mols with respect to one mol of the boronic acid dialkyl ester group.

Thus, the thermoplastic resin (B) having the boron-containing polar group as the functional group including the hetero atom can be obtained. There is no limitation regarding the content of the boron-containing polar group in the thermoplastic resin (B) that has a boron-containing polar group as the functional group including the hetero atom, but it is preferably 0.0001 to 1 meq/g (milliequivalent/g), in particular, preferably 0.001 to 0.1 meq/g.

The thermoplastic resin (B) having the carbon-carbon double bond and the functional group including the hetero atom in its molecule is formed by either one of the above-described reactions. For example, the thermoplastic resin (B) can be obtained by the process of adding a polymerization reaction mixture dropwise into a poor solvent such as methanol, causing precipitation, and then heating or drying the recovered precipitate under reduced pressure. Alternatively, the thermoplastic resin (B) can be obtained by the process of adding a polymerization reaction mixture into boiling water dropwise to cause azeotrope to remove the solvent, and then heating or drying the resultant residue under reduced pressure. The double bonds present after polymerization can be partly reduced with hydrogen within a range not interfering with the effects of the resin composition of the present invention.

The molecular weight of the thermoplastic resin (B) is preferably 1000 to 500000, more preferably 10000 to 250000, even more preferably 40000 to 200000. When the molecular weight of the thermoplastic resin (B) is less than 1000, the dispersibility thereof to the polyvinyl alcohol resin (A) may be reduced, so that the transparency, the gas barrier properties and the oxygen scavenging function may deteriorate. When the molecular weight of the thermoplastic resin (B) exceeds 500000, in addition to the above-described problems, the processability of the resin composition may deteriorate.

The thermoplastic resin (B) may be a single resin or a mixture of a plurality of resins.

In the first and the second resin compositions of the present invention, it is preferable that the difference in the refractive index between the thermoplastic resin (B) and the polyvinyl alcohol resin (A) is 0.01 or less. When the difference in the refractive index between the polyvinyl alcohol resin (A) and the thermoplastic resin (B) exceeds 0.01, the transparency of the obtained resin composition may deteriorate. The difference in the refractive index is more preferably 0.007 or less, and even more preferably 0.005 or less. When the polyvinyl alcohol resin (A) includes two or more polyvinyl alcohol resins (e.g., different two kinds of EVOH), the average of the refractive indices is calculated based on the refractive indices and the blend weight ratio of the two or more polyvinyl alcohol resins, and this average is determined as the refractive index of the blend.

The thermoplastic resin (B) can contain an antioxidant. As the antioxidant, for example, the following compounds can be used: 2,5-di-tert-butylhydroquinone, 2,6-di-tert-butyl-p-cresol, 4,4,'-thiobis(6-tert-butylphenol), 2,2'-methylene-bis(4-methyl-6-tert-butylphenol), octadecyl-3-(3',5'-di-tert-butyl-4'-hydroxyphenyl)propionate, 4,4'-thiobis(6-tert-butylphenol), 2-tert-butyl-6-(3-tert-butyl-2-hydroxy-5-methylbenzyl)-4-methylphenylacrylate, pentaerythritoltetrakis(3-laurylthiopropionate) and the like.

The amount of the antioxidant to be added is determined as appropriate, in view of the kinds and the contents of components of the resin composition, and the use and the storage conditions of the resin composition, and the like. In general, the amount of the antioxidant contained in the thermoplastic resin (B) is preferably 0.01 to 1% by weight, more preferably 0.02 to 0.5% by weight, based on the total weight of the thermoplastic resin (B) and the antioxidant. If a large amount of antioxidant is added, reaction of the thermoplastic resin (B) and oxygen is blocked, so that the oxygen barrier properties and the oxygen scavenging function of the resin composition of the present invention may be insufficient. On the other hand, if the amount of the antioxidant is too small, the reaction with oxygen proceeds during storage or melt-kneading of the thermoplastic resin (B), so that the oxygen scavenging function may be lowered before the resin composition of the present invention is actually put to use.

For example, in the case where the thermoplastic resin (B) is stored at a comparatively low temperature or under an inactive gas atmosphere, or the resin composition is produced by melt-kneading in a nitrogen-sealed state, the amount of the antioxidant can be small. In the case where an oxidation catalyst is added at melt mixing to facilitate oxidation, even though the thermoplastic resin (B) contains a certain amount of an antioxidant, a resin composition having good oxygen scavenging function can be obtained.

(Transition metal salt (C))

The second resin composition and the fourth resin composition of the present invention should contain a transition metal salt (C). It is preferable that the first resin composition and the third resin composition of the present invention contain a transition metal salt (C). The transition metal salt (C) has an effect of improving the oxygen scavenging function of the resin composition by facilitating the oxidation reaction of the thermoplastic resin (B). For example, the transition metal salt (C) facilitates a reaction of the thermoplastic resin (B) and oxygen present inside a packaging material obtained from the resin composition of the present invention as well as a reaction of the thermoplastic resin (B) and oxygen that passes through the packaging material, so that the oxygen barrier properties and the oxygen scavenging function of the packaging material can be improved.

In the second resin composition of the present invention, the transition metal salt (C) is contained in an amount of 1 to 5000 ppm in terms of the metal element. In other words, the transition metal salt (C) is contained in a ratio of 1 to 5000 parts by weight in terms of the metal element with respect to the total amount of the polyvinyl alcohol resin (A) and the thermoplastic resin (B) of 1,000,000 parts by weight. More preferably, the transition metal salt (C) is contained in the range of 5 to 1000 ppm, and even more preferably 10 to 500 ppm. If the content of the transition metal salt (C) is less than 1 ppm, the effect of the addition is insufficient. On the other hand, if the content of the transition metal salt (C) is more than 5000 ppm, the thermal stability of the resin composition of the present invention may be degraded, and decomposed gas, gels or aggregates may be generated significantly. In the first resin composition, if the transition metal salt (C) is contained, it is preferable that the transition metal salt (C) is contained in the same ratio as that for the second resin composition.

In the fourth resin composition of the present invention, the transition metal salt (C) is contained in an amount of 1 to 50000 ppm in terms of the metal element on the basis of the weight of the thermoplastic resin (B). More preferably, the transition metal salt (C) is contained in a ratio of 5 to 10000 ppm, even more preferably 10 to 5000 ppm. If the content of the transition metal salt (C) is less than 1 ppm, the effect of the addition is insufficient. On the other hand, if the content of the transition metal salt (C) is more than 50000 ppm, the thermal stability of the resin composition of the present invention may be degraded, and decomposed gas, gels or aggregates are generated significantly. In the third resin composition of the present invention if the transition metal salt (C) is contained, it is preferable that the transition metal salt (C) is contained in the same ratio as that for the fourth resin composition.

Examples of the transition metal contained in the transition metal salt (C) include, but are not limited to, iron, nickel, copper, manganese, cobalt, rhodium, titanium, chromium, vanadium, and ruthenium. Among these metals, iron, nickel, copper, manganese, and cobalt are preferable, with manganese and cobalt being more preferable, and cobalt being even more preferable.

Examples of counter ions of the metal contained in the transition metal salt (C) include anions derived from organic acids or chlorides. Examples of the organic acids include, but are not limited to, acetic acid, stearic acid, acetylacetone, dimethyldithiocarbamic acid, palmitic acid, 2-ethylhexanoic acid, neodecanoic acid, linoleic acid, tallic acid, oleic acid, resin acid, capric acid, and naphthenic acid. Especially preferred salts are cobalt 2-ethylhexanoate, cobalt neodecanoate, and cobalt stearate. The metal salt may be a so-called ionomer having a polymeric counter ion.

(Resin composition)

The first resin composition and the second resin composition of the present invention contain 70 to 99.9% by weight of polyvinyl alcohol resin (A) and 0.1 to 30% by weight of the thermoplastic resin (B) other than the polyvinyl alcohol resin (A). If the content of the polyvinyl alcohol resin (A) is less than 70% by weight, the molded article such as a multilayered container formed of the resin composition has poor transparency and poor gas barrier properties against oxygen gas, carbon dioxide gas or the like. On the other hand, if the content is more than 99.9% by weight, the content of the thermoplastic resin (B) is small, so that the oxygen barrier properties and the oxygen scavenging function are degraded. Preferable contents are 80 to 99% by weight for the polyvinyl alcohol resin (A) and 1 to 20% by weight for the thermoplastic resin (B), and more preferably, 85 to 98.5% by weight for the polyvinyl alcohol resin (A) and 1.5 to 15% by weight for the thermoplastic resin (B).

The oxygen absorption rate of the first resin composition of the present invention should be 0.001 ml/m$^2$·day or more, preferably 0.01 ml/m$^2$·day or more, and more preferably 0.05 ml/m$^2$·day or more. When the oxygen absorption rate is less than 0.001 ml/m$^2$·day, the oxygen barrier properties and the oxygen scavenging effect of a molded article formed of the resultant resin composition may be insufficient. It is preferable that the second resin composition of the present invention also has an oxygen absorption rate of the above-described values or more.

The oxygen absorption rate of the third resin composition of the present invention should be 0.1 ml/m$^2$·day or more, preferably 0.5 ml/m$^2$·day or more, more preferably 1 ml/m$^2$·day or more, and even more preferably 10 ml/m$^2$·day or more. It is preferable that the fourth resin composition of the present invention also has an oxygen absorption rate of the above-described values or more. The oxygen absorption rate is the volume of oxygen absorbed by a film of the resin composition per unit surface area in a unit period of time, when the film is left in the air with a predetermined volume. A specific method for measuring the rate will be described in the examples later.

The first and the second resin compositions of the present invention may contain a thermoplastic resin (D) other than the polyvinyl alcohol resin (A) and the thermoplastic resin (B) to the extent that does not impair the effects of the present invention. The third and the fourth resin compositions of the present invention also may contain a thermoplastic resin (D) other than the thermoplastic resin (B) to the extent that does not impair the effects of the present invention. Examples of the thermoplastic resin (D) include, but not limited to, the following compounds: polyolefins such as polyethylene, polypropylene, ethylene-propylene copolymer, a copolymer including ethylene or propylene, poly-4-methyl-1-pentene and poly-1-butene; polyesters such as polyethylene terephthalate, polybutylene terephthalate and polyethylene naphthalate; polyamides such as poly ε-caprolactam, polyhexamethylene adipamide and polymetaxylylene adipamide; polyvinylidene chloride, polyvinyl chloride, polystyrene, polyacrylonitrile, polycarbonate, and polyacrylate.

In the resin composition of the present invention, various additives can be added within a range not interfering with the function and the effects of the present invention. Examples of such additives include an antioxidant, a plasticizer, a thermal stabilizer, an ultraviolet absorber, an antistatic agent, a lubricant, a colorant, a filler, a desiccant, or other polymer compounds.

Among the above additives, as the thermal stabilizer (melt stabilizer), one or more substances selected from hydrotalcite compounds and metal salts of higher aliphatic carboxylic acids can be used preferably. These compounds can prevent generation of gels or fisheyes during the production of the resin composition, and can further improve the stability in a long time operation. It is preferable that these compounds are contained in an amount of 0.01 to 1 wt % with respect to the whole resin composition.

As the metal salts of higher aliphatic carboxylic acids, metal salts of higher fatty acids having 8 to 22 carbon atoms are used. Examples of higher fatty acids having 8 to 22 carbon atoms include lauric acid, stearic acid, and myristic acid. Examples of the metals of the metal salts include sodium, potassium, magnesium, calcium, zinc, barium and aluminum. Among these, alkaline-earth metals such as magnesium, calcium and barium are preferred. Among such metal salts of higher aliphatic carboxylic acids, calcium stearate and magnesium stearate are preferred.

A preferable melt flow rate (MFR) (210° C., 2160 g load, according to JIS K7210) of the resin composition of the present invention is 0.1 to 100 g/10 min., more preferably 0.5 to 50 g/10 min., and even more preferably 1 to 30 g/10 min. When the melt flow rate of the resin composition of the present invention fails to fall within the above range, the processability in melt-molding can become poor in many cases.

It is preferable that in the first and the second resin compositions of the present invention, the particles of the thermoplastic resin (B) are dispersed in the matrix containing the polyvinyl alcohol resin (A). A molded article made of such a resin composition has good transparency, gas barrier properties and oxygen scavenging function. In this case, it is preferable that the average particle size of the thermoplastic resin (B) is 10 μm or less. When the average particle size is more than 10 μm, the area of the interface between the thermoplastic resin (B) and the matrix made of the polyvinyl alcohol resin (A) and the like becomes small, so that the oxygen gas barrier properties and the oxygen scavenging function may be degraded. The average particle size of the particles of the thermoplastic resin (B) is preferably 5 μm or less, more preferably 2 μm or less.

(Processing of Resin Composition)

The method for mixing the components of the resin composition of the present invention is not limited to a particular method. The components can be mixed in any order. For example, when mixing the polyvinyl alcohol resin (A), the thermoplastic resin (B) and the transition metal salt (C), they can be mixed simultaneously. Alternatively, the thermoplastic resin (B) and the transition metal salt (C) can be mixed, and then the mixture can be mixed with the polyvinyl alcohol resin (A). Moreover, the polyvinyl alcohol resin (A) and the transition metal salt (C) can be mixed, and then the mixture can be mixed with the thermoplastic resin (B). Alternatively, the polyvinyl alcohol resin (A) and the thermoplastic resin (B) can be mixed, and then the mixture can be mixed with the transition metal salt (C). Furthermore, the mixture obtained by mixing the polyvinyl alcohol resin (A) and the thermoplastic resin (B) can be mixed with the mixture obtained by mixing the polyvinyl alcohol resin (A) and the transition metal salt (C).

As a specific method of mixing, melt-kneading is preferable because of the simplified process and the cost. In this case, it is preferable to use an apparatus with high kneading ability to allow the components to be finely and uniformly dispersed, because this can provide good oxygen absorption performance and good transparency, and can prevent gels and aggregates from being generated or mixed.

As the apparatus having a high kneading level, continuous kneaders such as a continuous intensive mixer and a kneading type twin screw extruder (co-rotation or counter-rotation), a mixing roll, and a Ko-kneader; batch kneaders such as a high-speed mixer, a Banbury mixer, an intensive mixer, or a pressure kneader; an apparatus using a rotary disk having a trituration mechanism such as a stone mill, for example, the KCK Kneading Extruder from KCK Co., Ltd.; a single screw extruder provided with a kneading section (e.g., Dulmage and CTM); and a simple kneader such as a ribbon blender and a Brabender mixer can be used. Among the above, continuous kneaders are preferable. Examples of available continuous intensive mixers include FCM from Farrel Corp., CIM from The Japan Steel Works, Ltd., and KCM, LCM, and ACM from Kobe Steel, Ltd. It is preferable to use an apparatus equipped with a single screw extruder underneath such a kneader to perform kneading and extrusion pelletizing simultaneously. Also as a twin screw kneading extruder equipped with a kneading disk or a kneading rotor, for example, TEX from Japan Steel Works, Ltd., ZSK from Werner & Pfleiderer Corp., TEM from Toshiba Machine Co., Ltd., and PCM from Ikegai Tekko Co, Ltd. can be used.

In these continuous kneaders, the shape of the rotor or disk plays a key role. In particular, the gap between the mixing chamber and the rotor chip or the disk chip (chip clearance) is important. Being too narrow or too wide fails to provide a mixture with a good dispersibility. The optimal chip clearance is in the range of 1 to 5 mm.

The rotational speed of the rotor of the kneader is generally 100 to 1200 rpm, preferably 150 to 1000 rpm, and more preferably 200 to 800 rpm. The inner diameter (D) of the chamber of the kneader is, for example, 30 mm or more, preferably in the range of 50 to 400 mm. The ratio (L/D) of the length (L) to the diameter (D) of the chamber of the kneader is preferably 4 to 30. A single kneader may be used, or two or more kneaders may be coupled for use.

The kneading temperature is generally in the range of 50 to 300° C. It is preferable to perform extrusion at low temperatures with the hopper port sealed with nitrogen in order to prevent oxidation of the thermoplastic resin (B). A longer kneading period provides better results. However, considering the prevention of oxidation of the thermoplastic resin (B) and the production efficiency, the kneading time is generally 10 to 600 seconds, preferably 15 to 200 seconds, even more preferably 15 to 150 seconds.

The resin composition of the present invention can be molded into various molded articles such as films, sheets, containers or other packaging materials by using various molding methods as appropriate. In this case, the resin composition of the present invention can be subjected to molding after being formed into pellets, or the components of the resin composition can be subjected directly to molding after being dry-blended.

With respect to molding methods and molded articles, for example, the resin composition of the present invention can be molded into films, sheets, pipes and the like by melt extrusion molding, into containers by injection molding and into bottle-like hollow containers by blow molding. As the blow molding, it is preferable to employ includes extrusion blow molding where a parison is formed by extrusion molding and blown for obtaining a molded article, and injection blow molding where a preform is formed by injection molding and blown for obtaining a molded article.

(Multilayered Structure and Multilayered Container)

In the present invention, the molded article produced by the above-described molding methods may be composed of a single layer, but it is preferable that the molded article is in the form of a multilayered structure obtained by laminating a layer of the resin composition of the present invention and other layers, in view of providing characteristics such as mechanical properties, water vapor barrier properties, and further oxygen barrier properties.

Examples of a layer structure of the multilayered structure includes x/y, x/y/x, x/z/y, x/z/y/z/x, x/y/x/y/x, and x/z/y/z/x/z/y/z/x, where x denotes a layer made of a resin other than the resin composition of the present invention, y denotes the resin composition layer of the present invention, and z denotes an adhesive resin layer, but the structure is not limited to these structures. In the case where a plurality of x layers are provided, such layers may be made of the same kind of resin or of different kinds of resin. A recovered resin layer made of scraps generated by trimming during molding may be additionally formed, or such recovered resin may be blended in a layer made of another resin. The thickness of the layers of the multilayered structure is not limited to a particular thickness. However, the ratio of the thickness of the y layer to the total thickness of all the layers is preferably 2 to 20%, in view of the moldability, the cost or the like.

A thermoplastic resin is preferable as a resin used for the x layer in view of the processability or the like. Examples of such a thermoplastic resin include, but are not limited to, the following resins: polyolefins such as polyethylene, polypropylene, ethylene-propylene copolymer, a copolymer including ethylene or propylene, poly-4-methyl-1-pentene and poly-1-butene; polyesters such as polyethylene terephthalate, polybutylene terephthalate, and polyethylene naphthalate; polyamides such as poly ε-caprolactam, polyhexamethylene adipamide, and polymetaxylylene adipamide; polyvinylidene chloride, polyvinyl chloride, polystyrene, polyacrylonitrile, polycarbonate, and polyacrylate. Such a thermoplastic resin layer may be a non-oriented layer or a layer subjected to uniaxial or biaxial drawing or rolling.

Among these thermoplastic resins, polyolefins are preferable because of their excellent moisture-resistance, mechanical properties, economy, heat sealing properties and the like. Polyesters are preferable because of excellent mechanical properties, heat resistance or the like.

On the other hand, there is no limitation regarding the adhesive resin used for the z layer, and any adhesive resin can be used, as long as it can bind the layers to each other. However, preferably used are polyurethane or polyester one-component or two-component curing adhesives, and carboxylic acid-modified polyolefin resin. The carboxylic acid-modified polyolefin resin is an olefin polymer or copolymer containing an unsaturated carboxylic acid or an anhydride thereof (e.g., maleic anhydride) as a copolymer component; or a graft copolymer obtained by grafting an unsaturated carboxylic acid or anhydride thereof to an olefin polymer or a copolymer.

Among these, a carboxylic acid-modified polyolefin resin is more preferable. In particular, when the x layer is a polyolefin resin, the adhesion with the y layer is good. Examples of such a carboxylic acid-modified polyolefin resin include a resin obtained by carboxylic acid modification of polyethylene (low density polyethylene (LDPE), linear low density polyethylene (LLDPE), or very low density polyethylene (VLDPE)), polypropylene, polypropylene copolymer, an ethylene-vinyl acetate copolymer, and ethylene-(meth)acrylate (for example, methyl acrylate or ethyl acrylate) copolymers.

Examples of the method for producing the multilayered structure include, but are not limited to, extrusion lamination, dry lamination, coinjection molding and coextrusion molding. Examples of the coextrusion molding includes coextrusion lamination, coextrusion sheet molding, coextrusion inflation process, and coextrusion blow molding.

The sheet, film, parison and the like of the thus obtained multilayered structure may further be reheated at a temperature below the melting point of the contained resin and stretched uniaxially or biaxially by thermoforming such as draw forming, rolling, pantographic drawing, inflation drawing or blow molding, so that stretched molded products can be obtained.

Since the transparency of the resin composition of the present invention is good, it is preferable that the layers of other resin to be laminated have good transparency in order to provide a packaging container that allows its content to be clearly visible. In view of these aspects, it is preferable that the haze of the multilayered structure having the resin composition layer of the present invention is 10% or less, more preferably 5% or less, and even more preferably 3% or less.

The molded articles using the multilayered structure can be used in various applications. In particular, when the multilayered structure is used as multilayered containers, the advantages provided by the multilayered structure are significantly prominent. Furthermore, layers having high water vapor barrier properties are provided on both sides or on the highly humid side of the resin composition layer of the present invention is preferable in that the retention period of the oxygen scavenging function is particularly prolonged, and as a result, very high gas barrier properties can be retained for a long time. On the other hand, the multilayered container having the resin composition layer as the innermost layer (innermost side of the container) is preferable in that the oxygen scavenging function in the container can be exerted promptly.

Furthermore, since the resin composition of the present invention has good transparency, it is suitable for a packaging container that allows its content to be clearly visible. Among such packaging containers, the following two embodiments of packaging containers have a strict requirement for transparency and thus particularly receive a benefit from the resin composition of the present invention. One embodiment is a container composed of a multilayered film having a total thickness of 300 μm or less and including a layer made of the resin composition of the present invention. The other embodiment is a multilayered container including at least one layer made of the resin composition of the present invention and at least one thermoplastic polyester (PES) layer. These containers will be described below in this order.

The container composed of a multilayered film having a total thickness of 300 μm or less and including a layer made of the resin composition of the present invention is a flexible container composed of a multilayered structure having a relatively small total thickness and generally is processed into the form of a pouch or the like. This container has excellent gas barrier properties, and further has a continuous oxygen scavenging function, and the production is simple, so that this container is very useful for packaging of a product that is highly sensitive to oxygen and susceptible to degradation.

In general, for a container that requires good transparency, each of the resin layers constituting the multilayered structure is thin so that a thin container as a whole can be produced. For example, in the case where crystalline resin such as polyolefin is used, if the thickness is large, the transparency tends to be poor due to scattering in the crystal. On the other hand, if the thickness of the container is small, good transparency can be obtained. In general, a non-oriented crystallized resin exhibits poor transparency, whereas an oriented crystallized resin exhibits good transparency. Such a uniaxially or biaxially oriented film is generally thin. Also from this point of view, a thin multilayered structure tends to exhibit good transparency.

The resin composition of the present invention has very good transparency. Therefore, the resin composition of the present invention can be used suitably as a container composed of a thin multilayered film for which transparency is often required. Even though the transparency of such a thin film deteriorates over time, the extent of the deterioration is small. The thickness of such a multilayered film is not limited to a particular thickness, but is preferably 300 μm or less, more preferably 250 μm or less, and even more preferably 200 μm or less, to retain the good transparency and flexibility. The total thickness of all layers is preferably 10 μm or more, more preferably 20 μM or more, and even more preferably 30 μm or more, in view of the mechanical strength as a container.

When producing the multilayered container with a multilayered film, there is no particular limitations regarding the method for producing the multilayered film. For example, a multilayered film can be formed by laminating a layer of the resin composition of the present invention and a layer of another thermoplastic resin by techniques such as dry lamination or coextrusion lamination.

In the case of dry lamination, non-oriented films, uniaxially oriented films, biaxially oriented films, and rolled films can be used. Among these, a biaxially oriented polypropylene film, a biaxially oriented polyethylene terephthalate film and a biaxially oriented poly ε-capramide film are suitable because of their mechanical strength. The biaxially oriented polypropylene film is particularly preferable also in view of good moisture-resistance. When non-oriented films or uniaxially oriented films are used, the laminated film may further be re-heated and stretched uniaxially or biaxially by thermoforming such as draw forming, rolling, pantographic drawing, or inflation drawing, so that an oriented multilayered film can be formed.

In order to seal the obtained multilayered container, it is preferable to form a layer made of a heat-sealable resin on at least one outermost layer surface of the multilayered film in the process of producing the multilayered film. Polyolefin such as polyethylene and polypropylene may be used as such a heat-sealable resin.

The thus obtained multilayered film can be processed into, for example, a bag shape and thus a packaging container to be filled with a material is obtained. Such a packaging container is flexible and convenient, and has good transparency and oxygen scavenging properties, so that it is significantly useful for packaging of materials that are susceptible to degradation by the presence of oxygen, especially for foods or the like.

The multilayered container including at least one layer made of the resin composition of the present invention and at least one layer made of the PES layer has good transparency, gas barrier properties, and excellent oxygen scavenging function. Therefore, the multilayered container is used in various forms such as a bag-shaped container, a cup-shaped container, or a hollow molded container. Among these, the hollow molded container, especially a bottle, is important.

Bottles made of PES are broadly used as containers for drinks at present. For this use, such bottles are required to prevent the contents from degrading and it is required that the contents, i.e., a drink, is clearly visible by the consumer. Moreover, when oxygen-sensitive drinks such as beer that easily degrade in flavor are to be filled, the bottles are required to have significantly high gas barrier properties and oxygen scavenging performance.

The multilayered container containing at least one layer of the resin composition of the present invention and at least one PES layer is most suitable for the above use because of its advantages of keeping the quality of the content from degrading while retaining the transparency. Regarding the layer structure of the multilayered container, an adhesive resin layer may be provided between the resin composition layer and the PES layer. However, the multilayered container in which the PES layers are in direct contact with both surfaces of the resin composition layer is particularly preferable because the following advantages of the present invention can be provided to a sufficient extent: the transparency is significantly excellent, and the resistance to impact delamination between the resin composition layer and the PES layer is excellent.

As the PES used for the multilayered container of the present invention including the layer made of the thermoplastic resin composition of the present invention and the PES layer, condensation polymers including aromatic dicarboxylic acids or alkyl esters thereof and diols as main components are used. In particular, PES including ethylene terephthalate as the main component is preferable in attaining the purpose of the present invention. More specifically, the total proportion (mol %) of a terephthalic acid unit and an ethylene glycol unit is preferably 70 mol % or more, and more preferably 90 mol % or more, of the total moles of all the structural units of the PES. If the total proportion of the terephthalic acid unit and the ethylene glycol unit is less than 70 mol %, the resultant PES is amorphous, so that the mechanical strength is insufficient. In addition, when the PES is stretched and formed into a container and the contents are hot-filled in the container, the thermal contraction is so large that it may not be put in practical use. Moreover, when solid-phase polymerization is carried out to reduce oligomers contained in the resin, the softened resin tends to stick, which makes production difficult.

If necessary, the above PES may contain a bifunctional compound unit other than the terephthalic acid unit and the ethylene glycol unit within the range in which the above-described problems are not caused. The proportion (mol %) thereof is preferably 30 mol % or less, more preferably 20 mol % or less, and even more preferably 10 mol % or less, of the total moles of all the structural units of the PES. Examples of such a bifunctional compound unit include a dicarboxylic acid unit, a diol unit, and a hydroxycarboxylic acid unit. Such bifunctional compound units may either be aliphatic, alicyclic, or aromatic bifunctional compound units. Specific examples thereof include a neopentyl glycol unit, a cyclohexanedimethanol unit, a cyclohexanedicarboxylic acid unit, an isophthalic acid unit, and a naphthalenedicarboxylic acid unit.

Among these, an isophthalic acid unit is advantageous since the resultant PES provides a broad range of conditions under which good products can be produced and provides good moldability. This results in a lowered defective production rate. This is also advantageous in that it suppresses crystallization rate, so that the molded article is prevented from whitening. Also preferable are a 1,4-cyclohexanedimethanol unit and a 1,4-cyclohexanedicarboxylic acid unit because the resultant molded article has even better strength against dropping. Naphthalene dicarboxylic acid is also preferable in that the resultant PES has a high glass transition temperature and thus, the thermal resistance is improved, and the ability of absorbing ultraviolet radiation can be provided. This is especially useful when the content is susceptible to degradation by ultraviolet radiation. For example, this is particularly useful when the content is susceptible to degradation by both oxidation and ultraviolet radiation, such as beer.

In the case of using a polycondensation catalyst during the production of the PES, a catalyst generally used for production of PES may be used. Examples thereof include: antimony compounds such as antimony trioxide; germanium compounds such as germanium dioxide, germanium tetraethoxide, and germanium tetra-n-butoxide; titanium compounds such as titanium tetramethoxide, titanium tetraethoxide, titanium tetra-n-propoxide, titanium tetraisopropoxide, and titanium tetrabutoxide; and tin compounds such as di-n-butyltin dilaurate, di-n-butyltin oxide, and dibutyltin diacetate. These catalysts may be used alone or in combination of two or more. The amount of the polycondensation catalyst used is preferably 0.002 to 0.8% by weight based on the weight of the dicarboxylic acid.

Among these, antimony compounds are preferable in view of the cost of the catalyst, and antimony trioxide is especially preferable. On the other hand, germanium compounds are preferable in that the resultant PES has a good color tone, and germanium dioxide is especially preferable. In view of moldability, the germanium compounds are more preferable than the antimony compounds. The PES obtained by the polymerization reaction using an antimony compound as a catalyst has a higher crystallization rate than the case using a germanium compound as a catalyst. This means that in the case of using an antimony compound, crystallization tends to proceed easily by heating during injection molding or blow molding. The resultant bottles are likely to generate whitening and may be poor in transparency. The degree of orientation by drawing may also be lowered, and an intended shape for molded bottles may not be obtained. This narrows the range of conditions under which good products can be produced, which tends to increase the rate of production of defective products.

In particular, when polyethylene terephthalate containing no copolymer component except for diethylene glycol unit as a by-product is used as the PES used for the present invention, it is preferable to use a germanium compound as the catalyst to suppress the crystallization rate when producing the PES.

The method for producing a multilayered container of the present invention including at least one layer made of the resin composition and at least one PES layer is not specifically defined, but coinjection blow molding is preferred in view of productivity. In coinjection blow molding, the container is produced by subjecting a multilayered container precursor (parison) obtained by coinjection molding to stretch blow molding.

In the coinjection molding, in general, the resins to constitute the layers of the multilayered structure are guided to a concentric nozzles from two or more injection cylinders and are injected into a single mold simultaneously or alternately at non-synchronized timings, and one clamping operation is performed for molding. For example, parisons are produced by, but not limited to, the following methods: (1) PES layers for the inner and outer layers are first injected, then the resin composition for the sandwiched layer is injected, and thus a molded container of a three-layered structure of PES/resin composition/PES is obtained; and (2) PES layers for the inner and outer layers are first injected, then the resin composition is injected, and the PES layer is injected again simultaneously with the injection of the resin composition or thereafter so that a molded container of a five-layered structure of PES/resin composition/PES/resin composition/PES is obtained.

Regarding the conditions for injection molding, the PES is preferably injected at a temperature in the range of 250 to 330° C., more preferably 270 to 320° C., even more preferably 280 to 310° C. If the injection temperature for PES is lower than 250° C., the PES is not sufficiently melted, and the resulting molded articles may have non-molten substances (fisheyes), worsening the appearance, and moreover, causing the degradation of the mechanical strength of the molded articles. In some extreme cases, the screw torque for the PES injection may increase, whereby the molding machine may have operational malfunctions. If the injection temperature for PES exceeds 330° C., PES may be highly decomposed, which may lead to a lowered molecular weight, so that the mechanical strength of the molded articles may be lowered. Moreover, the PES decomposition gives off some vapors of acetaldehyde and the like, and thus the properties of the materials to be filled in the molded articles may be worsened. Moreover, the oligomers resulting from the PES decomposition may contaminate the mold significantly, and the resultant molded articles may have a poor appearance.

The thermoplastic resin composition is preferably injected at a temperature in the range of 170 to 250° C., more preferably 180 to 240° C., and even more preferably 190 to 230° C. If the injection temperature for the resin composition is lower than 170° C., the resin composition is not sufficiently melted, and the resulting molded articles may have non-molten substances (fisheyes), and thus their appearance may be worsened. In some extreme cases, the screw torque for the injection of the resin composition may increase, so that the molding machine may have operational malfunctions. On the other hand, if the injection temperature for the resin composition exceeds 250° C., oxidation of the thermoplastic resin (B) may proceed, so that the gas barrier properties and the oxygen scavenging function of the resin composition may be degraded. In addition, the molded articles may be unfavorably colored and contain gelled materials, so that the appearance of the resulting molded articles may be poor. Moreover, the flow of the resin composition being injected will be disordered or blocked by vapors generated through decomposition of the resin composition and by the gelled materials, so that the layer of the resin composition may have failed areas. In some extreme cases, the gelled materials may make it impossible to continue the injection molding operation. In order to suppress the progress of the oxidation of the composition during melting, it is preferable to seal the supply hopper with nitrogen.

When the resin composition is made of a plurality of raw materials, the raw material components that are melted, blended and formed into pellets may be fed to the molding machine. Alternatively, each of the dry-blended raw material components may be fed to the molding machine.

The temperature of the hot runner parts through which PES and the resin composition run to be injected into the mold is preferably in the range of 220 to 300° C., more preferably 240 to 280° C., even more preferably 250 to 270° C. If the temperature of the hot runner parts is lower than 220° C., PES crystallizes and solidifies in the hot runner parts, which may make the molding operation difficult. If the temperature of the hot runner parts exceeds 300° C., oxidation of the thermoplastic resin (B) proceeds so that the gas barrier properties and the oxygen scavenging function of the resin composition may be degraded. In addition, the molded articles may be unfavorably colored and contain gelled materials, so that the appearance of the resulting molded articles may be poor. Moreover, the flow of the resin composition being injected may be disordered or blocked by vapors generated through decomposition of the resin composition and by the gelled materials. Thus, the layer of the resin composition may have failed areas. In some extreme cases, the gelled materials may make it impossible to continue the injection molding operation.

It is preferable that the mold temperature is in the range of 0 to 70° C., more preferably 5 to 50° C., even more preferably 10 to 30° C. With this, the crystallization of the PES and the resin composition in the parisons can be suppressed and they are uniformly stretched. Therefore, molded articles having improved delamination resistance, transparency, and good shape retentivity can be obtained. If the mold temperature is lower than 0° C., the dew formed around the mold may worsen the appearance of the parisons, and thus good molded articles may not be obtained. If the mold temperature exceeds 70° C., the crystallization of PES and the resin composition may not be suppressed. As a result, the parisons may fail to be uniformly stretched, and the resistance to delamination between the layers and the transparency of the resultant molded articles are degraded, and it is difficult to obtain molded articles of the intended shape.

The total thickness of the thus obtained parison is preferably in the range of 2 to 5 mm, and the total thickness of the thermoplastic resin composition layer or layers is preferably in the range of 10 to 500 μml.

The parison is directly in its high-temperature state, or after having been re-heated with heating means such as a block heater, an infrared heater, or the like, transferred to the next stretch blowing stage. In the stretch blowing stage, the heated parison is stretched one- to five-fold in the machine direction, and thereafter blown one- to four-fold with compressed air or the like so that the injection-blown molded multilayered container of the present invention can be produced. The temperature of the parison is preferably in the range of 85 to 140° C., more preferably 90 to 130° C., even more preferably 95 to 120° C. If the temperature of the parison exceeds 140° C., the PES easily crystallizes, so that the resultant container is whitened and its appearance may become poor. In addition, the delamination of the stretch-blown container will increase unfavorably. On the other hand, if the temperature of the parison is less than 85° C., the PES may be crazed to be pearly, so that the transparency of the resulting container may be lost.

The total thickness of the body part of the thus obtained multilayered container of the present invention generally is in the range of 100 to 2000 μm, preferably 150 to 1000 μm, and may vary depending on the use of the container. In this case, the total thickness of the resin composition layer is preferably in the range of 2 to 200 μm, more preferably 5 to 100 μm.

Thus, the multilayered containers including the layer made of the resin composition of the present invention and the PES layer are obtained. The containers have good transparency and also have excellent gas barrier properties and oxygen scavenging function. The containers are therefore suitable for packaging materials susceptible to degradation in the presence of oxygen, such as foods and medicines. Especially, they can be used most suitably as containers for drinks such as beer.

EXAMPLE

Hereinafter, the present invention will be described by way of examples, but is not limited thereto.

In the examples, analysis was performed as follows.

(1) Ethylene Content and the Degree of Saponification of EVOH:

The ethylene content and the degree of saponification of EVOH were calculated based on the spectrum obtained by $^1$H-NMR (nuclear magnetic resonance) measured using a deuterated dimethyl sulfoxide as a solvent ("JNM-GX-500 Model" manufactured by JEOL Ltd. was used for measurement).

(2) Content of Phosphoric Acid Radicals in EVOH:

First, 10 g of dry sample tips were put into 50 ml of 0.01 N hydrochloric acid, and the mixture was stirred at 95° C. for 6 hours. The resultant aqueous solution was quantitatively analyzed by ion chromatography to determine the phosphoric acid radical content as the content of phosphoric acid ions ($PO_4^{3-}$). As the column of the chromatography, CIS-A23 manufactured by Yokogawa Electric Corp. was used. As the eluent, an aqueous solution containing 2.5 mM sodium carbonate and 1.0 mM sodium hydrogencarbonate was used. The quantification was based on the calibration curve prepared by using aqueous solutions of phosphoric acid.

(3) Contents of Sodium Salt, Potassium Salt, and Magnesium Salt in EVOH:

First, 10 g of sample dry chips were put into 50 ml of 0.01 N hydrochloric acid, and the mixture was stirred at 95° C. for 6 hours. The resultant aqueous solution was quantitatively analyzed through ion chromatography to determine the sodium salt, potassium salt, and magnesium salt contents as the respective cation contents in terms of the metal. As the column of the chromatography, ICS-C25 manufactured by Yokogawa Electric Corp. was used. As the eluent, an aqueous solution containing 5.0 mM tartaric acid and 1.0 mM 2,6-pyridinedicarboxylic acid was used. The quantification was based on the calibration curves of aqueous solutions of sodium chloride, potassium chloride, and magnesium chloride, respectively.

(4) Number Average Molecular Weight of Copolymer and Number Average Molecular Weight of Styrene Block of the Copolymer The number average molecular weight of a copolymer was obtained in terms of polystyrene using gel permeation chromatography (GPC). The number average molecular weight of the styrene block in the copolymer was obtained in terms of polystyrene using GPC as well. Specifically, this molecular weight is obtained by measuring an intermediate that was sampled after polymerization of styrene for forming a first stryrene block by GPC.

(5) Styrene Content of Copolymer, Ratio of Structural Unit Represented by Formula (I) in the Isoprene Block, Content of Carbon-Carbon Double Bonds and the Number of Functional Groups Per Molecule:

All of these were calculated based on $^1$H-NMR (nuclear magnetic resonance) spectrum measured using a deuterated chloroform as a solvent ("JNM-GX-500 Model" manufactured by JEOL Ltd. was used for measurement). Herein, "styrene content" refers to the ratio (mol %) of styrene units to the total monomer units constituting the copolymer. The "ratio of structural unit represented by formula (I) in the isoprene block" refers to the ratio (%) of the structural unit represented by formula (I) (3,4-isoprene unit and 1,2-isoprene unit) to the total structural units derived from isoprene (1,4-isoprene unit, 3,4-isoprene unit, and 1,2-isoprene unit). Further, based on these results, the content of carbon-carbon double bonds was calculated as the molar amount (eq/g) of the double bonds contained in 1 g of the resin. Furthermore, the molar amount (mol %) of functional groups with respect to the mols of the total monomer units constituting the copolymer was calculated and the number of functional groups per molecule of the copolymer was calculated based on the number average molecular weight of the copolymer.

(6) Melt Flow Rate:

Sample resin or resin composition chips were put into a cylinder having an inner diameter of 9.55 mm and a length of 162 mm of a melt indexer, L244 (manufactured by Takara Industry), and were molten therein at 210° C. A load was uniformly applied to the molten resin with a plunger having a weight of 2,160 g and a diameter of 9.48 mm, by which the resin was extruded out of the cylinder through an orifice at its center having a diameter of 2.1 mm. The amount of the resin or the resin composition extruded per unit time (g/10 min) was measured, and determined as a melt flow rate.

(7) Refractive Index:

Sample resin chips were subjected to film extrusion molding at an extrusion temperature of 210° C. so that a non-oriented film having a thickness of 20 μm was obtained. The refractive index of this film was measured using an Abbe refractometer (4T Model manufactured by Atago Co., Ltd., SL-Na-1 Lamp manufactured by Toshiba Corp.).

(8) Haze Value

Sample resin or resin composition chips were subjected to film extrusion molding at an extrusion temperature of 210° C. so that a non-oriented film having a thickness of 20 μm was obtained. The haze value of this film was measured using a Poic integrating-sphere light transmittance/complete light reflectance meter (HR-100 Model manufactured by Murakami Color Technology Laboratories) according to ASTM D1003-61. Multilayered films were also subjected to the above measurement. As for multilayered bottles, the body of the bottle was divided into four portions along the circumference at its center. The internal haze values of the respective four portions were measured and averaged to determine the resulting mean value as the haze value of the bottle.

(9) Contents of Structural Units of PET:

The contents of respective structural units of PET were calculated based on $^1$H-NMR (nuclear magnetic resonance) spectrum measured using deuterated trifluoroacetic acid as a solvent ("JNM-GX-500 Model" manufactured by JEOL Ltd. was used for measurement).

(10) Intrinsic Viscosity of PET:

A sample film layer was taken out of the PET layer of the body part of a multilayered container and dissolved in a 1/1 (by weight) mixed solvent of phenol and tetrachloroethane. The viscosity of the resultant solution was measured at 30° C. using an Ubbelohde's viscometer (HRK-3 Model from Hayashi Seisakusho).

(11) Melting Point and Glass Transition Temperature of PET:

A sample film layer was taken out of the PET layer of the body part of a multilayered container, and the measurement was carried out according to JIS K7121 using a differential scanning calorimeter (DSC) RDC220/SSC5200H Model (manufactured by Seiko Electronics Industry). Specifically, the sample was kept at 280° C. for 5 minutes, cooled to 30° C. at a cooling rate of 100° C./min, kept at the temperature for 5 minutes, and then heated at a heating rate of 10° C./min. For temperature calibration, indium and lead were used. The melting peak temperature (Tpm) and the midway glass transition temperature (Tmg) according to JIS K7121 were obtained from the resultant chart, and determined as the melting point and the glass transition temperature, respectively.

(Resins Used in the Examples and the Comparative Examples)

In the examples and the comparative examples, EVOH was used as polyvinyl alcohol resin (A). The following table shows the properties of the EVOHs used in the examples.

TABLE 2

| EVOH | Ethylene content mol % | Degree of saponification % | MFR g/10 min*[1] | Content of phophoric acid radicals ppm | Content of sodium salt ppm*[2] | Content of potassium salt ppm*[2] | Content of magnesium salt ppm*[2] | Refractive index | Haze value % |
|---|---|---|---|---|---|---|---|---|---|
| A-1 | 44 | 99.5 | 13.3 | 95 | 85 | 50 | 45 | 1.528 | 1.0 |
| A-2 | 44 | 96.5 | 12.2 | 85 | 70 | 33 | 25 | 1.528 | 0.5 |

*[1]210° C., 2160 g load
*[2]in terms of metal

The triblock copolymers α, β, γ, δ and ε prepared by the following synthesis examples were used as the thermoplastic resin (B).

Synthesis Example 1

Synthesis of Triblock Copolymer α in which a hydroxyl Group is Introduced into its Terminal In a pressure-resistant container with a stirrer, 50000 parts by volume of cyclohexane, 1000 parts by weight of sufficiently dried styrene and 90 parts by weight of cylcohexane solution (10 wt %) of sec-butyl lithium were fed for polymerization at 40° C. for 60 min. Then, 272 parts by weight of tetrahydrofuran (abbreviated as "THF" in the following) as a Lewis base were added, 8000 parts by weight of isoprene were added, and polymerization was conducted for 60 min. Then, 1000 parts by weight of styrene were added and polymerization was conducted for further 60 min.

Thereafter, 8 parts by weight of ethylene oxide were added, and 2-tert-butyl-6-(3-tert-butyl-2-hydroxy-5-methylbenzyl)-4-methylphenyl acrylate, and pentaerythritoltetrakis(3-laurylthiopropionate) as anti-oxidants were added to the resultant reaction mixture in an amount of 0.15 parts by weight each with respect to 100 parts by weight of the total amount of styrene and isoprene. Finally, methanol was added to the mixture in order to stop the reaction. The reaction product was separated and dried so that a styrene-isoprene-styrene triblock copolymer (triblock copolymer α) having a hydroxyl group at its terminal was obtained.

The number average molecular weight of the thus obtained triblock copolymer α was 79000. The molecular weight of each styrene block in the copolymer was 7900. The styrene content was 14 mol %. The ratio of the structural unit represented by formula (I) in the isoprene block was 55%. The content of carbon-carbon double bonds in the copolymer was 0.014 eq/g, and the number of hydroxyl groups per molecule was 0.80. The melt flow rate (210° C.-2160 g load) was 9.2 g/10 min. The refractive index of this copolymer was 1.531, and its haze value was 1.0%.

Synthesis Example 2

Synthesis of Triblock Copolymer β in which a trimethoxysilyl Group is Introduced Into its Terminal In the same manner as in Synthesis Example 1, styrene, isoprene and styrene were sequentially polymerized. Thereafter, 38 parts by weight of 3-trimethoxysilylpropyl chloride were added, and 2-tert-butyl-6-(3-tert-butyl-2-hydroxy-5-methylbenzyl)-4-methylphenyl acrylate and pentaerythritoltetrakis(3-lauryl thiopropionate) were added to the resultant reaction mixture in an amount of 0.15 parts by weight each with respect to 100 parts by weight of the total amount of styrene and isoprene. Finally, methanol was added in order to stop the reaction. The reaction product was separated and dried so that a styrene-isoprene-styrene triblock copolymer (triblock copolymer β) having a trimethoxysilyl group at its terminal was obtained.

The number average molecular weight of the thus obtained triblock copolymer β was 79000. The molecular weight of each styrene block in the copolymer was 7900. The styrene content was 14 mol %. The ratio of the structural unit represented by formula (I) in the isoprene block was 55%. The content of carbon-carbon double bonds in the copolymer was 0.014 eq/g, and the number of trimethoxysilyl groups per molecule was 0.70. The melt flow rate (210° C.-2160 g load) was 8.5 g/10 min. The refractive index of this copolymer was 1.532, and its haze value was 0.9%.

Synthesis Example 3

Synthesis of Triblock Copolymer γ in which a carboxyl Group is Introduced Into its Terminal In the same manner as in Synthesis Example 1, styrene, isoprene and styrene were sequentially polymerized. Thereafter, carbon dioxide gas was added, and the reaction mixture was stirred for 30 minutes. Further, 2-tert-butyl-6-(3-tert-butyl-2-hydroxy-5-methylbenzyl)-4-methylphenyl acrylate, and pentaerythritoltetrakis(3-lauryl thiopropionate) were added to the resultant reaction mixture in an amount of 0.15 parts by weight each with respect to 100 parts by weight of the total amount of styrene and isoprene. Finally, methanol was added to the mixture in order to stop the reaction. The reaction product was separated and dried so that a styrene-isoprene-styrene triblock copolymer (triblock copolymer γ) having a carboxyl group at its terminal was obtained.

The number average molecular weight of the thus obtained triblock copolymer γ was 79000. The molecular weight of each styrene block in the copolymer was 7900. The styrene content was 14 mol %. The ratio of the structural unit represented by formula (I) in the isoprene block was 55%. The content of carbon-carbon double bonds in the copolymer was 0.014 eq/g, and the number of carboxyl groups per molecule was 0.75. The melt flow rate (210° C.-2160 g load) was 9.0 g/10 min. The refractive index of this copolymer was 1.531, and its haze value was 1.0%.

Synthesis Example 4

Synthesis of Triblock Copolymer δ Having no Functional Groups

In the same manner as in Synthesis Example 1, styrene, isoprene and styrene were sequentially polymerized. Thereafter, 2-tert-butyl-6-(3-tert-butyl-2-hydroxy-5-methylbenzyl)-4-methylphenyl acrylate and pentaerythritoltetrakis(3-lauryl thiopropionate) were added to the resultant reaction mixture in an amount of 0.15 parts by weight each with respect to 100 parts by weight of the total amount of styrene and isoprene. Finally, methanol was added to the mixture in order to stop the reaction. The reaction product was separated and dried so that a styrene-isoprene-styrene triblock copolymer (triblock copolymer δ) was obtained.

The number average molecular weight of the thus obtained triblock copolymer δ was 79000. The molecular weight of each styrene block in the copolymer was 7900. The styrene content was 14 mol %. The ratio of the structural unit represented by formula (I) in the isoprene block was 55%. The content of carbon-carbon double bonds in the copolymer was 0.014 eq/g. The melt flow rate (210° C.-2160 g load) was 9.3 g/10 min. The refractive index of this copolymer was 1.531, and its haze value was 1.1%.

Synthesis Example 5

Synthesis of Triblock Copolymer ε in which a boronic Acid 1,3-butanediol Ester Group is Introduced Into its Side Chain The triblock copolymer ε was supplied to a twin screw extruder at a speed of 8000 parts by weight/hour. Then, a mixed liquid of borane-triethylamine complex (TEAB) and boric acid 1,3-butanediol ester (BBD) (a weight ratio of TEAB/BBD=29/71) was supplied by the use of a liquid feeder at a speed of 160 parts by weight/hour (46 parts by weight/hour for TEAB and 114 parts by weight for BBD), and continuously kneaded. As a result, a styrene-isoprene-styrene triblock copolymer (triblock copolymer ε) having a boronic acid 1,3-butanediol ester group in its side chain was obtained.

The structure of the twin screw extruder used for the reaction and the operation conditions are as follows.

Co-rotation twin screw extruder TEM-35B (manufactured by Toshiba Machine Co. Ltd.)

| | |
|---|---|
| Screw diameter | 37 mm φ |
| L/D | 52.8 |
| Liquid feeder | C8 |
| Vent position | C6 (vent 1), C14 (vent 2) |
| Screw configuration | Seal rings are used at positions C7 and C12 |
| Temperature setting: | C1 water-cooling |
| | C2 220° C. |
| | C3 to C15 260° C. |
| | Die 250° C. |
| Screw rotational speed: | 400 rpm |

The number average molecular weight of the thus obtained triblock copolymer ε was 79000. The molecular weight of each styrene block in the copolymer was 7900. The styrene content was 14 mol %. The ratio of the structural unit represented by formula (I) in the isoprene block was 55%. The content of carbon-carbon double bonds in the copolymer was 0.014 eq/g, and the number of boronic acid 1,3-butane diol ester groups per molecule was 9.30. The melt flow rate (210° C.-2160 g load) was 7.7 g/10 min. The refractive index of this copolymer was 1.531, and its haze value was 1.1%.

The properties of the triblock copolymers α, β, γ, 67 and ε are shown in the following table.

were 50.0 mol %, 48.9 mol %, and 1.1 mol %, respectively. The intrinsic viscosity was 0.83 dl/g, and the melting point and the glass transition temperature were 252° C. and 80° C., respectively.

Example 1

First, 95 parts by weight of the EVOH (A-1) shown in Table 2, 5 parts by weight of the triblock copolymer α as the themoplastic resin (B) and 0.2121 parts by weight of cobalt (II) stearate (0.0200 parts by weight in terms of cobalt atoms) were dry-blended. The blend was extruded into pellets with a 30 mm 100 twin screw extruder (TEX-30SS-30CRW-2V, manufactured by Japan Steel Works, Ltd.) at 210° C., a screw rotational speed of 300 rpm, and an extruded resin amount of 25 kg/hour. These pellets were dried at 30° C. under reduced pressure for 16 hours to give resin composition pellets. The melt flow rate (210° C.-2160 g load) of the resin composition was 13.0 g/10 min. Observation of the cutting plane of the resin composition pellets through an electron microscope confirmed that the triblock copolymer α was dispersed in the form of a particle having a size of about 1 μm or less in the matrix of the EVOH.

The obtained resin composition pellets were extrusion-molded at an extrusion temperature of 210° C. into a film having a thickness of 20 μm. The haze value of the film was 1.0%. Then, 0.9 m² (0.2 m×4.5 m; a surface area of 1.8 m²) of this film was rolled 5 hours after the film was formed and put in a conical flask with an internal volume of 375 ml filled with air of 20° C. and 65% RH. The air in the conical flask contained oxygen and nitrogen in a ratio by volume of 21:79. The opening of the conical flask was sealed with a multilayered sheet including an aluminum layer with an epoxy resin, and then the flask was allowed to stand at 20° C. The air inside was sampled with a syringe 2 days, 4 days and 8 days after the sealing, and the oxygen concentration in this air was measured with gas chromatography. A small hole formed through the multilayered sheet was sealed with an epoxy resin every time the hole was formed. The oxygen decrease amount (oxygen absorption amount) was calculated based on the volume ratio of oxygen and nitrogen obtained by the measurement, and then the results shown in FIG. 1 were obtained. The oxygen absorption rate of the film calculated from the measurement results after 2 days and after 8 days was 1.165 ml/m²·day.

TABLE 3

| Thermoplastic resin (B) | Functional group | Position of functional group | Number of functional groups per molecule | MFR g/10 min*3 | Refractive index | Haze value % |
|---|---|---|---|---|---|---|
| Triblock copolymer α | Hydroxyl group | Terminal | 0.80 | 9.2 | 1.531 | 1.0 |
| Triblock copolymer β | Trimethylsilyl group | Terminal | 0.70 | 8.5 | 1.532 | 0.9 |
| Triblock copolymer γ | Carboxyl group | Terminal | 0.75 | 9.0 | 1.531 | 1.0 |
| Triblock copolymer ε | Boronic acid 1,3-butanediol ester group | Side chain | 9.30 | 7.7 | 1.531 | 1.1 |
| Triblock copolymer δ | — | — | — | 9.3 | 1.531 | 1.1 |

*3 210° C., 2160 g load

Figure 2:
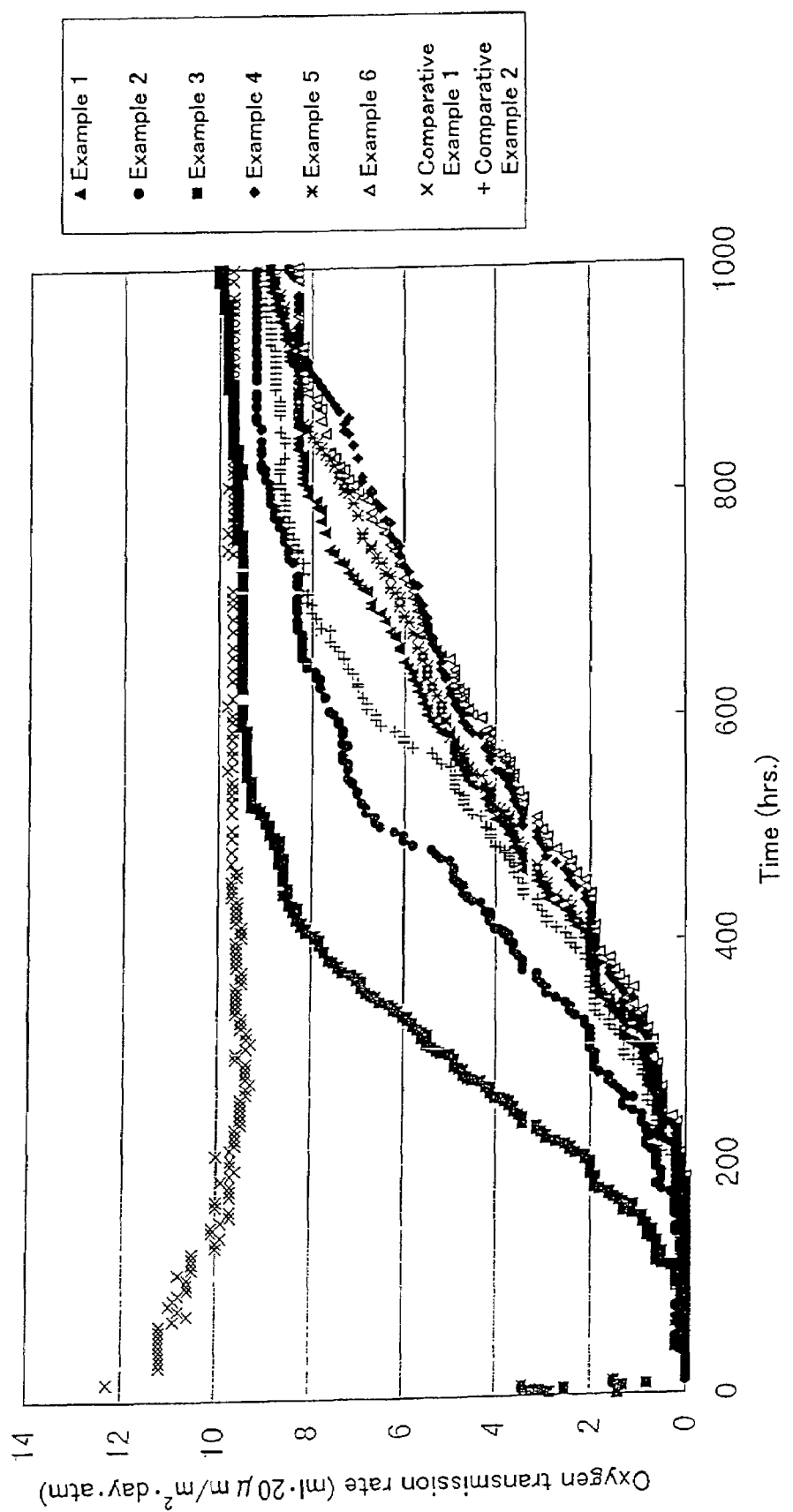
FIG. 2 is a graph in which the oxygen transmission rate of each of the multilayered films obtained in Examples 1 to 6 and Comparative Examples 1 and 2 is plotted with respect to time.

As the thermoplastic polyester, polyethylene terephthalate (PET) obtained by polymerization using germanium dioxide as a catalyst was used. The contents of terephthalic acid unit, ethylene glycol unit and diethylene glycol unit in this PET Next, oriented polypropylene films each having a thickness of 20 μm (OP-#20 U-1 from Tohcello Co., Ltd.) was laminated on both surfaces of the obtained film with a toluene/methyl ethyl ketone mixed solution (weight ratio of 1:1) of an urethane adhesive (AD335A from Toyo Morton Ltd.) and a curing agent (Cat-10 from Toyo Morton Ltd.) to obtain a multilayered film. The haze value of this multilayered film was 2.3%. The oxygen transmission rate was measured with this multilayered film at an adjusted temperature and humidity of 20° C.-85% RH for 1000 hours starting from the point of time of 24 hours after the film formation, using an oxygen transmission amount measurement device (OX-TRAN-10/50A manufactured by Modern Control Corp.). Then, the results shown in FIG. 2 were obtained.

Next, using the resin composition pellets and the above-described PET as raw materials and using a coinjection stretch blow molding machine (ASB-50HT Model manufactured by Nissei ASB, 500 ml), a three-layered parison comprising two kinds of resin of PET/resin composition/PET was obtained. The temperature of the PET injector was 290° C. The temperature of the resin composition injector was 205° C. The temperature of the hot runner block portion in which the PET and the resin composition were combined was 255° C. The temperature of the injection mold core was 15° C., and the temperature of the injection mold cavity was 15° C. The cycle time was 40 seconds. Thereafter, using a stretch blow molding machine (LB01) manufactured by CORPOPLAST GmbH & Co., the parison was heated to 105° C. at its surface, and subjected to stretch blow molding to obtain a three-layered coinjection blow-molded bottle composed of two kinds of resin. In the body part of the bottle, the mean thickness of the inner PET layer, the intermediate layer of the resin composition and the outer PET layer were 100 μm, 15 μm and 150 μm, respectively, and the bottom of the bottle is champagne bottle-shaped. The haze value of this bottle was 2.8%.

The temperature and the humidity of the obtained bottle were adjusted to 20° C.-65% RH for the outside of the bottle and 20° C.-100% RH for the inside thereof. Using an oxygen transmission amount measurement device (OX-TRAN-10/50A manufactured by Modern Control Corp.), the oxygen transmission rate per container 10 days after the molding was measured and the result was 0.00 ml/container·day·atm.

Separately, water was filled in the bottle as the content, and the bottle was airtightly closed under atmospheric pressure. This bottle with its body in the vertical direction was spontaneously dropped only one time from a height of 50 cm to a horizontal concrete plate with the bottom of the bottle facing downward. For one kind of bottle, 100 bottles were tested, and the delamination incidence rate Rd (%) was calculated from the following equation with the number of bottles Nd in which delamination occurred. The result was 8%.

$$Rd=(Nd/100)\times 100$$

Example 2

First, 100 parts by weight of the triblock copolymer α used in Example 1 and 4.2420 parts by weight of cobalt (II) stearate (0.4000 parts by weight in terms of cobalt atoms) were dry-blended. The blend was extruded into pellets with a 30 mm φ twin screw extruder (TEX-30SS-30CRW-2V, manufactured by Japan Steel Works, Ltd.) at 200° C., a screw rotational speed of 300 rpm, and an extruded resin amount of 25 kg/hour while purging the cylinder with nitrogen. These pellets were dried at 30° C. under reduced pressure for 8 hours to give resin composition pellets composed of the triblock copolymer α and cobalt stearate.

Figure 3:
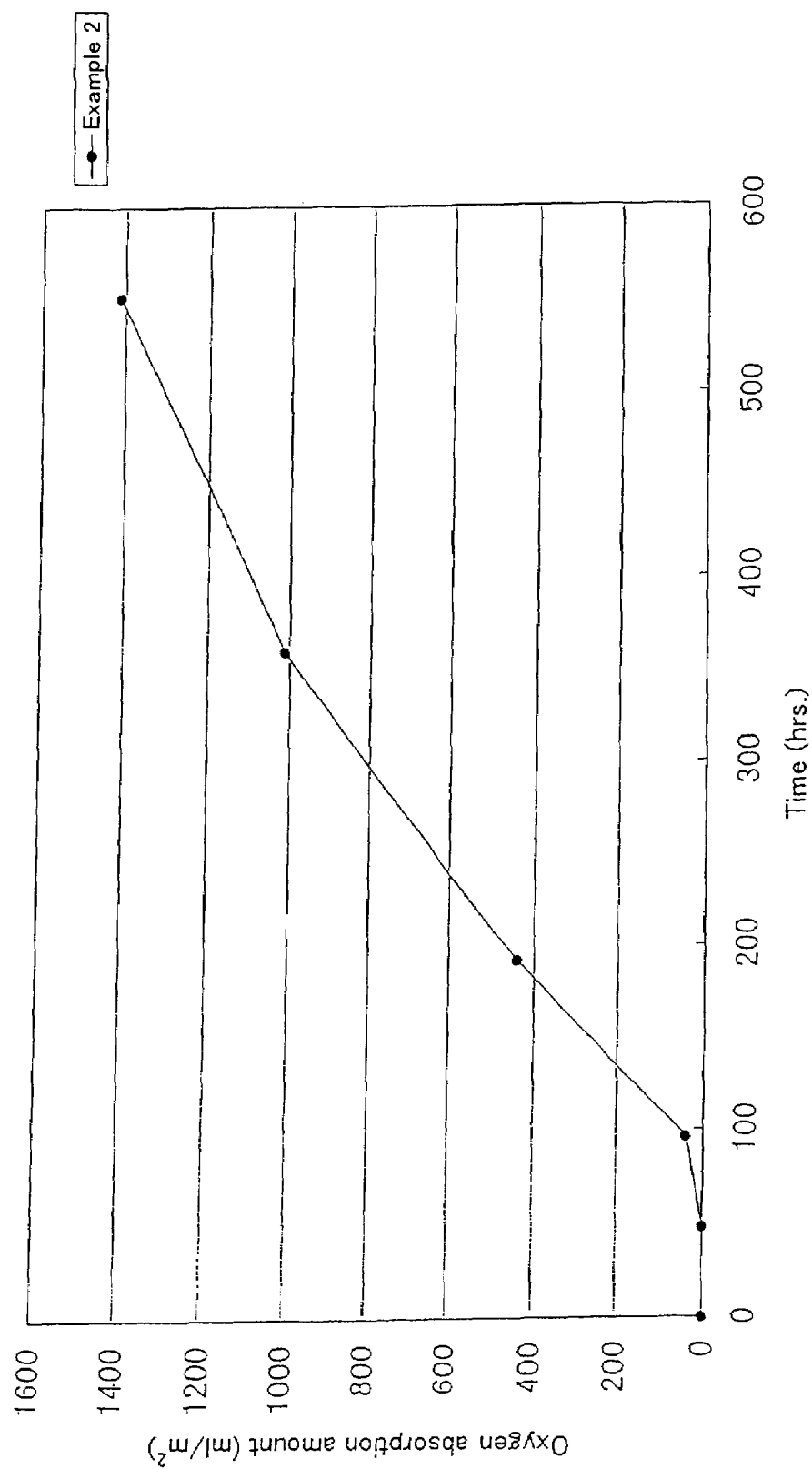
FIG. 3 is a graph in which the oxygen absorption amount of the first single layer film obtained in Example 2 is plotted with respect to time.

A film having a thickness of 20 μm (a first single layer film) was obtained from this resin composition in the same manner as in Example 1. The haze value was measured and found to be 0.5%. When the oxygen absorption amount was measured, the results shown in FIG. 3 were obtained. The oxygen absorption rate of the film was 73 ml/m²·day.

A resin composition was obtained in the same manner as in Example 1, using 95 parts by weight of the EVOH (A-1) used in Example 1 and 5.2121 parts by weight of the above resin composition. The melt flow rate (210° C.-2160 g load) of this resin composition was 13.2 g/10 min. Observation of the cutting plane of the resin composition pellets through an electron microscope confirmed that the triblock copolymer α was dispersed in the form of a particle having a size of about 1 μm or less in the matrix of the EVOH.

A film having a thickness of 20 μm (a second single layer film) was obtained from this resin composition in the same manner as in Example 1. The haze value was measured and found to be 1.0%. When the oxygen absorption amount was measured, the results shown in FIG. 1 were obtained. The oxygen absorption rate of the film was 1.277 ml/m²·day. Then, a multilayered film was obtained in the same manner as in Example 1, and the haze value was measured and found to be 2.3%. When the oxygen transmission rate was measured over time, the results shown in FIG. 2 were obtained.

Furthermore, a bottle was obtained in the same manner as in Example 1. The haze value was measured and found to be 2.9%. When the oxygen transmission rate of this bottle was measured in the same manner as in Example 1, the result was 0.00 ml/container·day·atm. When the dropping test was conducted in the same manner as in Example 1, the delamination incidence rate was 9%.

Example 3

First, 78.0 parts by weight of the EVOH (A-1) and 19.5 parts by weight of EVOH (A-2) shown in Table 2, 2.5 parts by weight of the triblock copolymer α used in Example 1, and 0.2121 parts by weight of cobalt (II) stearate (0.0200 parts by weight in terms of the cobalt atoms) were used to obtain a resin composition in the same manner as in Example 1. The melt flow rate (210° C.-2160 g load) of this resin composition was 13.0 g/10 min. Observation of the cutting plane of the resin composition pellets through an electron microscope confirmed that the triblock copolymer α was dispersed in the form of a particle having a size of about 1 μm or less in the matrix of the EVOH.

A film having a thickness of 20 μm was obtained from this resin composition in the same manner as in Example 1. The haze value was measured and found to be 0.8%. When the oxygen absorption amount was measured, the results shown in FIG. 1 were obtained. The oxygen absorption rate of the film was 1.092 ml/m²·day. Next a multilayered film was produced in the same manner as in Example 1. The haze value was measured and found to be 2.1%. When the oxygen transmission rate was measured over time, the results shown in FIG. 2 were obtained.

Furthermore, a bottle was obtained in the same manner as in Example 1. The haze value was measured and found to be 2.3%. When the oxygen transmission rate of this bottle was measured in the same manner as in Example 1, the result was 0.00 ml/container·day·atm. When the dropping test was conducted in the same manner as in Example 1, the delamination incidence rate was 0%.

Example 4

Resin composition pellets were obtained in the same manner as in Example 1, except that the triblock copolymer β was used instead of the triblock copolymer α. The melt flow rate (210° C.-2160 g load) of this resin composition was 13.0 g/10 min. Observation of the cutting plane of the resin composition pellets through an electron microscope confirmed that the triblock copolymer β was dispersed in the form of a particle having a size of about 1 μm in the matrix of the EVOH.

A film having a thickness of 20 μm was obtained from this resin composition in the same manner as in Example 1. The haze value was measured and found to be 0.8%. When the oxygen absorption amount was measured, the results shown in FIG. 1 were obtained. The oxygen absorption rate of the film was 1.467 ml/m$^2$·day. Next a multilayered film was produced in the same manner as in Example 1. The haze value was measured and found to be 2.2%. When the oxygen transmission rate was measured over time, the results shown in FIG. 2 were obtained.

Furthermore, a bottle was obtained in the same manner as in Example 1. The haze value was measured and found to be 2.4%. When the oxygen transmission rate of this bottle was measured in the same manner as in Example 1, the result was 0.00 ml/container·day·atm. When the dropping test was conducted in the same manner as in Example 1, the delamination incidence rate was 2%.

Example 5

Resin composition pellets were obtained in the same manner as in Example 1, except that the triblock copolymer γ was used instead of the triblock copolymer α. The melt flow rate (210° C.-2160 g load) of this resin composition was 13.1 g/10 min. Observation of the cutting plane of the resin composition pellets through an electron microscope confirmed that the triblock copolymer γ was dispersed in the form of a particle having a size of about 1 μm or less in the matrix of the EVOH.

A film having a thickness of 20 μm was obtained from this resin composition in the same manner as in Example 1. The haze value was measured and found to be 0.9%. When the oxygen absorption amount was measured, the results shown in FIG. 1 were obtained. The oxygen absorption rate of the film was 1.182 ml/m$^2$·day. Next a multilayered film was produced in the same manner as in Example 1. The haze value was measured and found to be 2.3%. When the oxygen transmission rate was measured over time, the results shown in FIG. 2 were obtained.

Furthermore, a bottle was obtained in the same manner as in Example 1. The haze value was measured and found to be 2.6%. When the oxygen transmission rate of this bottle was measured in the same manner as in Example 1, the result was 0.00 ml/container·day·atm. When the dropping test was conducted in the same manner as in Example 1, the delamination incidence rate was 6%.

Example 6

Resin composition pellets were obtained in the same manner as in Example 1, except that the triblock copolymer ε was used instead of the triblock copolymer α. The melt flow rate (210° C.-2160 g load) of this resin composition was 13.2 g/10 min. Observation of the cutting plane of the resin composition pellets through an electron microscope confirmed that the triblock copolymer ε was dispersed in the form of a particle having a size of about 1 μm or less in the matrix of the EVOH.

A film having a thickness of 20 μm was obtained from this resin composition in the same manner as in Example 1. The haze value was measured and found to be 1.0%. When the oxygen absorption amount was measured, the results shown in FIG. 1 were obtained. The oxygen absorption rate of the film was 1.208 ml/m$^2$·day. Next a multilayered film was produced in the same manner as in Example 1. The haze value was measured and found to be 2.5%. When the oxygen transmission rate was measured over time, the results shown in FIG. 2 were obtained.

Furthermore, a bottle was obtained in the same manner as in Example 1. The haze value was measured and found to be 2.9%. When the oxygen transmission rate of this bottle was measured in the same manner as in Example 1, the result was 0.00 ml/container·day·atm. When the dropping test was conducted in the same manner as in Example 1, the delamination incidence rate was 5%.

Comparative Example 1

EVOH (A-1) was used alone to obtain a film having a thickness of 20 μm in the same manner as in Example 1. When the oxygen absorption amount was measured, the results shown in FIG. 1 were obtained. The oxygen absorption rate of the film was 0.000 ml/m$^2$·day. Next a multilayered film was produced in the same manner as in Example 1. The haze value was measured and found to be 2.1%. When the oxygen transmission rate was measured over time, the results shown in FIG. 2 were obtained.

Furthermore, a bottle was obtained in the same manner as in Example 1. The haze value was measured and found to be 2.1%. When the oxygen transmission rate of this bottle was measured in the same manner as in Example 1, the result was 0.03 ml/container·day·atm. When the dropping test was conducted in the same manner as in Example 1, the delamination incidence rate was 10%.

Comparative Example 2

Resin composition pellets were obtained in the same manner as in Example 1, except that the triblock copolymer δ was used instead of the triblock copolymer α. The melt flow rate (210° C.-2160 g load) of this resin composition was 13.5 g/10 min. Observation of the cutting plane of the resin composition pellets through an electron microscope confirmed that the triblock copolymer δ was dispersed in the form of a particle having a size of about 1 to 2 μm in the matrix of the EVOH.

A film having a thickness of 20 μm was obtained from this resin composition in the same manner as in Example 1. The haze value was measured and found to be 1.5%. When the oxygen absorption amount was measured, the results shown in FIG. 1 were obtained. The oxygen absorption rate of the film was 1.104 ml/m$^2$·day. Next a multilayered film was produced in the same manner as in Example 1. The haze value was measured and found to be 2.9%. When the oxygen transmission rate was measured over time, the results shown in FIG. 2 were obtained.

Furthermore, a bottle was obtained in the same manner as in Example 1. The haze value was measured and found to be 3.3%. When the oxygen transmission rate of this bottle was measured in the same manner as in Example 1, the result was 0.00 ml/container·day·atm. When the dropping test was conducted in the same manner as in Example 1, the delamination incidence rate was 52%.

The components of the above resin compositions are shown collectively in Table 4, and the results of the various evaluation are shown collectively in Table 5.

TABLE 4

| Resin composition | EVOH (a1) EVOH resin | EVOH (a1) Amount parts by weight | EVOH (a2) EVOH resin | EVOH (a2) Amount parts by weight | Thermoplastic resin (B) Amount parts by weight | Transition metal salt (C) Amount ppm*4 |
|---|---|---|---|---|---|---|
| Example 1 | A-1 | 95.0 | — | — | 5.0 | 200 |
| Example 2 | A-1 | 95.0 | — | — | 5.0 | 200 |
| Example 3 | A-1 | 78.0 | A-2 | 19.5 | 2.5 | 200 |
| Example 4 | A-1 | 95.0 | — | — | 5.0 | 200 |
| Example 5 | A-1 | 95.0 | — | — | 5.0 | 200 |
| Example 6 | A-1 | 95.0 | — | — | 5.0 | 200 |
| Comparative Example 1 | A-1 | 100.0 | — | — | — | — |
| Comparative Example 2 | A-1 | 95.0 | — | — | 5.0 | 200 |

*4 in terms of metal

TABLE 5

| | Resin composition | | | Resin composition | Bottle | Bottle | Bottle |
|---|---|---|---|---|---|---|---|
| | MFR g/10 min*5 | Haze value % | Oxygen absorption rate ml/m².day | Multilayered film Haze value % | Haze value % | Oxygen transmission rate ml/container.day.atm | Delamination incidence rate % |
| Example 1 | 13.0 | 1.0 | 1.165 | 2.3 | 2.8 | 0.00 | 8 |
| Example 2 | 13.2 | 1.0 | 1.277 | 2.3 | 2.9 | 0.00 | 9 |
| Example 3 | 13.0 | 0.8 | 1.092 | 2.1 | 2.3 | 0.00 | 0 |
| Example 4 | 13.0 | 0.8 | 1.467 | 2.2 | 2.4 | 0.00 | 2 |
| Example 5 | 13.1 | 0.9 | 1.182 | 2.3 | 2.6 | 0.00 | 6 |
| Example 6 | 13.2 | 1.0 | 1.208 | 2.5 | 2.9 | 0.00 | 5 |
| Comparative Example 1 | 13.3 | 1.0 | 0.000 | 2.1 | 2.1 | 0.03 | 10 |
| Comparative Example 2 | 13.5 | 1.5 | 1.104 | 2.9 | 3.3 | 0.00 | 52 |

*5 210° C., 2160 g load

INDUSTRIAL APPLICABILITY

The present invention provides a resin composition having an excellent oxygen scavenging function. This resin composition is easy to handle and can be molded to an arbitrary shape. In particular, a container made of this resin composition not only has good gas barrier properties, moisture-resistance, aroma retentivity, and flavor barrier properties, but also excellent impact delamination resistance, and good appearance, especially good transparency. Therefore, the resin composition of the present invention can be used effectively as a container of products that have high sensitivity to oxygen and are easily degraded, in particular, foods, drinks, medicines, cosmetics or the like.

The invention claimed is:

1. A resin composition comprising
   70 to 99.9 wt % of a polyvinyl alcohol resin (A),
   0.1 to 30 wt % of a thermoplastic resin (B), which has a carbon-carbon double bond and a functional group including a hetero atom, and which is other than the polyvinyl alcohol resin (A), and
   a transition metal salt (C);
   wherein the thermoplastic resin (B) is dispersed in a matrix of the polyvinyl alcohol resin (A) in the form of particles,
   wherein the average particle size of the thermoplastic resin (B) is 10 μm or less, and
   wherein the oxygen absorption rate of the resin composition is 0.001 ml/m²·day or more.

2. The resin composition of claim 1, wherein the transition metal salt (C) is contained in a ratio of 1 to 5000 ppm in terms of a metal element, based on a total weight of the polyvinyl alcohol resin (A) and the thermoplastic resin (B).

3. The resin composition of claim 1, wherein the transition metal salt (C) comprises at least one transition metal selected from the group consisting of iron, nickel, copper, manganese, and cobalt.

4. The resin composition of claim 1, wherein the thermoplastic resin (B) comprises a carbon-carbon double bond in a ratio of 0.0001 eq/g or more.

5. The resin composition of claim 1, wherein the thermoplastic resin (B) comprises a unit represented by formula (I)

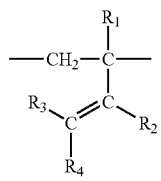

wherein
$R_1$ is a hydrogen atom or an alkyl group having 1 to 5 carbon atoms, $R_2$ is a hydrogen atom, an alkyl group having 1 to 10 carbon atoms, an aryl group, an alkylaryl group, an arylalkyl group or an alkoxy group, $R_3$ $R_4$ are each independently a hydrogen atom, an alkyl group having 1 to 10 carbon atoms, an aryl group that can be substituted, —$COOR_5$, —$OCOR_6$, a cyano group or a halogen atom, and $R_5$ $R_6$ are each independently an alkyl group having 1 to 10 carbon atoms, an aryl group, an alkylaryl group, an arylalkyl group or an alkoxy group.

6. The resin composition of claim 1, wherein a number average molecular weight of the thermoplastic resin (B) is 1,000 to 500,000.

7. The resin composition of claim 1, wherein the polyvinyl alcohol resin (A) is an ethylene-vinyl alcohol copolymer having an ethylene content of 5 to 60 mol% and a degree of saponification of 90% or more.

8. The resin composition of claim 1, wherein the functional group including a hetero atom contained in the thermoplastic resin (B) is at least one functional group selected from the group consisting of a hydroxyl group, a carbonyl group, a trialkoxysilyl group and a boron-containing polar group.

9. The resin composition of claim 1, wherein the oxygen absorption rate of the resin composition is 0.05 ml/$m^2$·day or more.

10. The resin composition of claim 1, wherein the thermoplastic resin (B) comprises an aromatic vinyl compound unit and a diene compound unit.

11. The resin composition of claim 10, wherein the diene compound unit is at least one of an isoprene unit and a butadiene unit.

12. The resin composition of claim 10, wherein the aromatic vinyl compound unit is a styrene unit.

13. The resin composition of claim 10, wherein the thermoplastic resin (B) is a block copolymer.

* * * * *

UNITED STATES PATENT AND TRADEMARK OFFICE
CERTIFICATE OF CORRECTION

PATENT NO. : 7,255,904 B2  Page 1 of 1
APPLICATION NO. : 10/111911
DATED : August 14, 2007
INVENTOR(S) : Shinji Tai et al.

It is certified that error appears in the above-identified patent and that said Letters Patent is hereby corrected as shown below:

On Title Page

First page, insert terminal disclaimer information item (*) and item (45)

-- This patent is subject to a terminal disclaimer --

Signed and Sealed this

Eighteenth Day of March, 2008

JON W. DUDAS
*Director of the United States Patent and Trademark Office*